(12) United States Patent
Thellefsen et al.

(10) Patent No.: US 11,807,527 B2
(45) Date of Patent: Nov. 7, 2023

(54) METHOD FOR PRODUCTION OF ELEMENTAL SULFUR BY PART OR FULLY CATALYTIC OXIDATION OF CLAUS TAIL GAS

(71) Applicant: HALDOR TOPSØE, Kgs. Lyngby (DK)

(72) Inventors: Morten Thellefsen, Hillerød (DK); Martin Møllerhøj, Birkerød (DK); Mads Lykke, Brønshøj (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 17/606,607

(22) PCT Filed: Apr. 29, 2020

(86) PCT No.: PCT/EP2020/061939
§ 371 (c)(1),
(2) Date: Oct. 26, 2021

(87) PCT Pub. No.: WO2020/225062
PCT Pub. Date: Nov. 12, 2020

(65) Prior Publication Data
US 2022/0234891 A1 Jul. 28, 2022

(30) Foreign Application Priority Data

May 3, 2019 (DK) .................................. 2019 00543
May 28, 2019 (DK) .................................. 2019 00655
(Continued)

(51) Int. Cl.
*C01B 17/04* (2006.01)
*C01B 17/76* (2006.01)
(Continued)

(52) U.S. Cl.
CPC ...... *C01B 17/0404* (2013.01); *B01D 53/1481* (2013.01); *B01D 53/1493* (2013.01);
(Continued)

(58) Field of Classification Search
CPC . C01B 17/0404; C01B 17/80; C01B 17/0253; C01B 17/0447; C01B 17/0452;
(Continued)

(56) References Cited

U.S. PATENT DOCUMENTS 3,617,221 A 11/1971 Egan et al.
4,070,424 A 1/1978 Olson et al.
(Continued)

FOREIGN PATENT DOCUMENTS

CN 106219499 A 12/2016
CN 107311117 A 11/2017
(Continued)

OTHER PUBLICATIONS

Danish Search Report dated Dec. 4, 2019 by the Danish Patent and Trademark Office in corresponding Danish Patent Application No. PA 2019 00681. (9 pages).
(Continued)

*Primary Examiner* — Timothy C Vanoy
(74) *Attorney, Agent, or Firm* — Boone IP Law

(57) ABSTRACT

A process and a process plant for production of elemental sulfur from a feedstock gas including from 15 vol % to 100 vol % H2S and a stream of sulfuric acid, the process including a) providing a Claus reaction furnace feed stream with a substoichiometric amount of oxygen, b) directing s to a reaction furnace operating at elevated temperature, c) cooling, d) directing to contact a material catalytically active in the Claus reaction, e) withdrawing a Claus tail gas and elemental sulfur, f) directing to a means for sulfur oxidation, g) directing to contact a material catalytically active in SO2
(Continued)

oxidation to SO3, h) converting to concentrated sulfuric acid, i) recycling to the Claus reaction furnace, wherein an amount of combustibles, in the Claus tail gas, is oxidized in the presence of a material catalytically active in sulfur oxidation, at an inlet temperature below 400° C.

14 Claims, 3 Drawing Sheets

(30) Foreign Application Priority Data

Jun. 4, 2019 (DK) .................................. 2019 00681
Jun. 5, 2019 (DK) .................................. 2019 00687

(51) Int. Cl.

| | |
|---|---|
| *C01B 17/80* | (2006.01) |
| *B01D 53/14* | (2006.01) |
| *B01D 53/86* | (2006.01) |
| *F23G 7/06* | (2006.01) |
| *C01B 17/02* | (2006.01) |
| *B01J 19/00* | (2006.01) |
| *B01J 19/24* | (2006.01) |
| *C01B 17/775* | (2006.01) |

(52) U.S. Cl.
CPC ...... *B01D 53/8615* (2013.01); *B01J 19/0013* (2013.01); *B01J 19/2405* (2013.01); *B01J 19/2465* (2013.01); *C01B 17/0253* (2013.01); *C01B 17/0447* (2013.01); *C01B 17/0452* (2013.01); *C01B 17/0456* (2013.01); *C01B 17/76* (2013.01); *C01B 17/775* (2013.01); *C01B 17/80* (2013.01); *C01B 17/806* (2013.01); *F23G 7/06* (2013.01); *B01D 2255/20723* (2013.01); *B01J 2219/00157* (2013.01); *C01P 2006/80* (2013.01); *F23G 2209/14* (2013.01)

(58) Field of Classification Search
CPC . C01B 17/0456; C01B 17/775; C01B 17/806; C01B 17/76; B01D 53/8615; B01D 53/1481; B01D 53/1493; B01D 2255/20723; B01J 19/0013; B01J 19/2405; B01J 19/2465; B01J 2219/00157; F23G 7/06; F23G 2209/14; C01P 2006/80
See application file for complete search history.

(56) References Cited

U.S. PATENT DOCUMENTS

| | | | |
|---|---|---|---|
| 4,208,192 A | 6/1980 | Quigley et al. | |
| 4,826,670 A | 5/1989 | Hegarty | |
| 5,278,123 A | 1/1994 | Chopin et al. | |
| 6,056,936 A | 5/2000 | Nougayrede et al. | |
| 2009/0226353 A1 | 9/2009 | Tekie et al. | |
| 2017/0044015 A1 | 2/2017 | Rameshni et al. | |
| 2022/0177306 A1 | 6/2022 | Thellefsen et al. | |
| 2022/0177307 A1 | 6/2022 | Thellefsen et al. | |
| 2022/0227625 A1 | 7/2022 | Thellefsen et al. | |

FOREIGN PATENT DOCUMENTS

| | | |
|---|---|---|
| CN | 207468199 U | 6/2018 |
| DE | 2430909 A1 | 1/1976 |
| EP | 0134594 A1 | 3/1985 |
| EP | 0633219 A1 | 1/1995 |
| EP | 2878358 A1 | 6/2015 |
| EP | 2878367 A1 | 6/2015 |
| WO | 2012089776 A1 | 7/2012 |
| WO | 2012152919 A1 | 11/2012 |
| WO | 2016198369 A1 | 12/2016 |
| WO | 2017220655 A1 | 12/2017 |
| WO | 2018096178 A1 | 5/2018 |
| WO | 2018169903 A1 | 9/2018 |

OTHER PUBLICATIONS

Danish Search Report dated Dec. 6, 2019 by the Danish Patent and Trademark Office in corresponding Danish Patent Application No. PA 2019 00687. (9 pages).

Danish Search Report dated Oct. 29, 2019 by the Danish Patent and Trademark Office in corresponding Danish Patent Application No. PA 2019 00655. (10 pages).

Danish Search Report dated Oct. 9, 2019 by the Danish Patent and Trademark Office in corresponding Danish Patent Application No. PA 2019 00543. (10 pages).

International Search Report (PCT/ISA/210) and Written Opinion (PCT/ISA/237) dated Jul. 17, 2020, by the European Patent Office as the International Searching Authority for International Application No. PCT/EP2020/061934. (12 pages).

International Search Report (PCT/ISA/210) and Written Opinion (PCT/ISA/237) dated Jul. 14, 2020, by the European Patent Office as the International Searching Authority for International Application No. PCT/EP2020/061940. (9 pages).

International Search Report (PCT/ISA/210) and Written Opinion (PCT/ISA/237) dated Jul. 29, 2020, by the European Patent Office as the International Searching Authority for International Application No. PCT/EP2020/061939. (9 pages).

International Search Report (PCT/ISA/210) and Written Opinion (PCT/ISA/237) dated Jun. 29, 2020, by the European Patent Office as the International Searching Authority for International Application No. PCT/EP2020/061937. (8 pages).

First Office Action with English translation dated May 8, 2023, by the China National Intellectual Property Administration for Chinese Application No. (2020103722895), 11 pages.

METHOD FOR PRODUCTION OF ELEMENTAL SULFUR BY PART OR FULLY CATALYTIC OXIDATION OF CLAUS TAIL GAS

The present invention is related to a process for conversion of $H_2S$ to elemental sulfur and sulfuric acid, optionally with an adjustable ratio between elemental sulfur and sulfuric acid.

$H_2S$ is a common side product in many processes, including hydrodesulfurization of refinery streams, natural gas processing and production of viscose fibres. It is desirable to convert $H_2S$ prior to emission to the atmosphere as $H_2S$ is highly toxic, odorous and an environmental challenge.

Refinery processes, besides producing the well-known high concentration $H_2S$ gas, may often also produce a so-called sour water stripper gas, which comprises $H_2S$, $H_2O$ and $NH_3$ in almost equal amounts.

Especially in refineries, the chosen process for $H_2S$ abatement has been the Claus process, which has been known and optimized for more the 8 decades. The Claus process proceeds by sub-stoichiometric combustion of $H_2S$ producing $SO_2$ in a Claus reaction furnace, providing a Claus converter feed gas. The subsequent Claus process will convert $H_2S$ and $SO_2$ to form elemental sulfur, which may be condensed and withdrawn.

Typically, the removal efficiency of the Claus process is 95% to 98%, which is insufficient for environmental compliance. Therefore, it is common practice to provide a tail gas treatment after the Claus process to provide sulfur abatement above 99%. The tail gas treatment is often a sulfuric acid plant, which introduces the requirement for handling of sulfuric acid.

It has now been identified that the sulfuric acid may be recycled to the Claus reaction furnace, where it may contribute to the formation of sulfur, and in addition provide opportunities for optimization of the Claus and Claus tail gas process size and operational cost. It is furthermore identified that the configuration of the sulfuric acid plant with catalytic oxidation of at least an amount the Claus tail gas is having additional benefits with respect to energy consumption.

In WO 2012/152919 A1, a sulfuric acid process for treatment of Claus tail gas is presented in which the conversion of $H_2S$ to $H_2SO_4$ in a Claus tail gas is described. The steps in the process are:
1. Sub-stoichiometric oxidation
2. Claus conversion
3. Oxidation of reduced sulfur species ($H_2S$) in the Claus tail gas in oxygen rich atmosphere at 400-700° C.
4. Catalytic oxidation of $SO_2$ to $SO_3$
5. Condensation of $H_2SO_4$ It is recognized that the $H_2SO_4$ product is not always desirable and it is suggested to recycle the sulfuric acid to an upstream Claus reaction furnace or the $H_2S$ oxidation step as described above. However, the recycling of sulfuric acid is merely thought as an abatement of sulfuric acid, and the consequences of recycling the $H_2SO_4$ on the wet sulfuric acid or Claus process have not been evaluated, i.e. it is not recognized that $H_2SO_4$ recirculation requires a reduction in the amount of $O_2$ directed to the Claus reaction furnace, nor are the beneficial effects on the Claus and sulfuric acid process realized.

In WO 2012/152919 A1 it is also recognized that support fuel may be required in both the Claus reaction furnace and $H_2S$ oxidation step to obtain the desired operating temperature, without realizing the beneficial effects of using feedstock gases as support fuel for the $H_2S$ oxidation in the sulfuric acid process.

The proposal to recycle $H_2SO_4$ to the Claus reaction furnace will therefore in itself not provide a working process, but require additional process modifications.

According to the present invention a process for conversion of $H_2S$ to elemental sulfur with increased conversion and thermal efficiency is presented, in which a Claus process is combined with a sulfuric acid process. According to this process, sulfuric acid produced in the sulfuric acid process, treating the Claus tail gas, is recycled to the Claus reaction furnace for decomposition and elemental sulfur production.

For the purpose of the present application, a stoichiometric amount of oxygen shall be defined under the assumption that the products derived from N, H, C, S and O in the feed gas are $N_2$, $H_2O$, $CO_2$ and $SO_2$. If less than a stoichiometric amount of oxygen is present (also called sub-stoichiometric), this means that not all feed components are fully oxidized. For a Claus gas feed, this means that the process gas after sub-stoichiometric combustion/reaction may contain unconverted $H_2S$, $NH_3$ and hydrocarbons from the feed stream(s) and $H_2$, CO, COS and $CS_2$ formed in the $O_2$ deficit environment.

For the purpose of the present application, a fuel shall be defined as a composition which, when oxidized with $O_2$ will form $N_2$, $H_2O$, $CO_2$ and $SO_2$ as the reaction product and release a substantial amount of energy by the reactions. A mixture of hydrocarbons (e.g. natural gas, with $CH_4$ and $C_2H_6$) as well as $H_2S$ is a typical fuel gas, but the fuel gas could also comprise CO, $NH_3$ and $H_2$.

For the purpose of the present application, oxygen ($O_2$) is understood as a stream containing $O_2$, such as air, enriched air and pure oxygen, but could also be a process gas containing $O_2$.

For the purpose of the present application, a means for sulfur oxidation shall be understood as any process equipment receiving reduced sulfur compounds (such as $H_2S$, COS and $CS_2$) or elemental sulfur, converting it into $SO_2$. Such means for sulfur oxidation may be a incinerator, catalytic equipment or combinations thereof. The term combustor may also be used in place of the term incinerator, without implying a difference.

For the purpose of the present application, combustibles shall be understood as reduced sulfur compounds, elemental sulfur or fuels, which in a flame in the presence of excess oxygen may be oxidized to $H_2O$, $CO_2$ or $SO_2$, including $H_2S$, COS, $CS_2$, $CH_4$, $NH_3$, CO and $H_2$.

For the purpose of the present application, a sulfuric acid section is understood a facility for converting a process gas comprising $SO_2$ to sulfuric acid. A sulfuric acid section may be implemented as a catalytic section oxidizing $SO_2$ to $SO_3$, followed by either a condenser providing sulfuric acid by condensing hydrated $SO_3$, or an absorber providing sulfuric acid by absorbing $SO_3$ in sulfuric acid, but other means for production of sulfuric acid from $SO_2$ such as $H_2O_2$ scrubbers are also known to the skilled person.

For the purpose of the present application, a sulfuric acid plant is understood as a means of sulfur oxidation followed by a sulfuric acid section, receiving sulfur compounds (such as $H_2S$, $SO_2$, COS and $CS_2$) or elemental sulfur and converting it into sulfuric acid.

For the purpose of the present application, the Claus reaction furnace may be described as comprising two zones; a reaction furnace zone and a sulfuric acid evaporation zone. The names of these zones are merely designations of the individual zones and not exclusive description of the chemical reaction occurring therein.

For the purpose of the present application, a homogeneous reaction zone may be described as a volume or compartment in which a combination of temperature, $O_2$ concentration and residence time of the process gas passing through the volume or compartment allow for more than 80% conversion, partly or fully, of one or more reactive compounds contained in the process gas.

In a broad aspect the present invention relates to a process for production of elemental sulfur from a feedstock gas comprising from 15 vol %, 20 vol %, 30 vol %, 40 vol % or 50 vol % to 99 vol % or 100 vol % $H_2S$ and a stream of sulfuric acid involving the steps of a. providing a Claus reaction furnace feed stream comprising an amount of said feedstock gas, an amount of sulfuric acid, an amount of oxygen and optionally an amount of fuel, wherein the amount of oxygen is substoichiometric with respect to the Claus reaction, b. directing said Claus reaction furnace feed stream to a reaction furnace operating at elevated temperature such as above 900° C., providing a Claus converter feed gas, c. cooling said Claus converter feed gas to provide a cooled Claus converter feed gas and optionally withdrawing elemental sulfur from the gas d. directing said cooled Claus converter feed gas to contact a material catalytically active in the Claus reaction, e. withdrawing a Claus tail gas and elemental sulfur, optionally by cooling the effluent from said material catalytically active in the Claus reaction, f. directing a stream comprising said Claus tail gas, oxygen and optionally a fuel as a feedstock gas to a means for sulfur oxidation, providing a $SO_2$ converter feed gas, g. directing said $SO_2$ converter feed gas to contact a material catalytically active in $SO_2$ oxidation to $SO_3$, providing an $SO_3$ rich gas, h. converting said $SO_3$ rich gas to concentrated sulfuric acid, either by absorption of $SO_3$ in sulfuric acid or by hydration of $SO_3$, cooling and condensation of sulfuric acid, i. recycling at least a part of the produced sulfuric acid to the Claus reaction furnace, characterized by an amount of combustibles, in the Claus tail gas, being oxidized in the presence of a material catalytically active in sulfur oxidation, at an inlet temperature below 400° C., with the associated benefit of allowing the design and operation of a Claus tail gas sulfuric acid plant, with significant reduction in support fuel consumption and reduction in size and cost of $SO_2$ oxidation and sulfuric acid condensation steps.

In a further embodiment, the concentration of said concentrated sulfuric acid is at least 80 w/w % or 90 w/w % $H_2SO_4$, with the associated benefit of such concentrated sulfuric acid providing $O_2$ for the Claus reaction, while avoiding excessive evaporation of water due to the use of less concentrated sulfuric acid.

In a further embodiment, the amount of sulfur in the stream of concentrated sulfuric acid is higher than 1%, 3% or 5% and less than 17%, 21% or 25% of the total amount of elemental sulfur withdrawn from the process, with the associated benefit of such an amount of concentrated sulfuric acid providing a $O_2$ for the Claus reaction, while avoiding excessive thermal requirements for evaporation of sulfuric acid.

In a further embodiment, an amount of the Claus tail gas, such as less than 40% or 50%, is directed to an incinerator, providing a combusted Claus tail gas, which is combined with a further amount of Claus tail gas, such as the remainder of the Claus tail gas, with the associated benefit of providing more stable thermal Claus tail gas oxidation, an incinerator for use if the sulfuric acid section is inoperable and a significantly reduced amount of support fuel.

In a further embodiment, the combined combusted Claus tail gas and further amount of Claus tail gas in the presence of at least 2 vol % $O_2$ is directed to a homogeneous reaction zone with a temperature exceeding 400° C. and at least 0.5 second residence time is provided, with the associated benefit of providing an energy efficient oxidation of an amount of Claus tail gas at moderate temperature, and thus reducing the required volume of catalytically active material and temperature increase in the reactor comprising the catalytically active material.

In a further embodiment, a turbulence enhancer is installed in said homogeneous reaction zone, with the associated benefit of increasing the conversion in the homogeneous reaction zone.

In a further embodiment, a steam generating heat exchanger is provided at the outlet of said homogeneous reaction zone, with the associated benefit of providing a high thermal efficiency of the overall process and a stable process gas temperature to the downstream sulfuric acid section.

In a further embodiment, the amount of the Claus tail gas which is directed to the incinerator is controlled such that the temperature increase from the oxidation of remaining combustibles in the Claus tail gas in the catalytic part of the means of sulfur oxidation is kept below 100° C., 150° C. or 200° C., with the associated benefit of ensuring efficient and long term operation of the catalysts.

In a further embodiment, none of the Claus tail gas is directed to a non-catalytic means of oxidation, with the associated benefit of avoiding the operation of a Claus tail gas incinerator, and thus avoiding a requirement of heating the Claus tail gas excessively prior to oxidation in an incinerator, e.g. by adding a support fuel which would add operation cost as well as increased equipment cost due to a higher flow.

In a further embodiment, an amount of fuel and oxidant is directed to an incinerator, wherein the process may be reconfigured during operation to direct all of said Claus tail gas to the incinerator, with the associated benefit of enabling continued operation in the case of a forced shut down of the sulfuric acid section in the Claus tail gas treatment plant.

In a further embodiment, the temperature increase in the catalytic Claus tail gas oxidation reactors is kept below 150-200° C. by dilution of the catalytic Claus tail gas oxidation reactor feed gas with an amount of recycled oxidized Claus tail gas and/or an amount of oxidant, with the associated benefit of ensuring efficient and long term operation of the catalysts.

In a further embodiment, one or both of the catalytic Claus tail gas oxidation reactors are internally cooled reactors, with the associated benefit of simplifying the control scheme, especially for feedstock with high variability.

In a further embodiment, oxidant and an optional process gas volume is added to the Claus tail gas in proportions keeping the mixture of Claus tail gas, an optional process gas volume and oxidant below the lower flammability level (LFL) of the mixture, with the associated benefit of safe operation at high efficiency.

In a further embodiment, oxidant is added to the Claus tail gas in two or more stages in proportions keeping the mixture of Claus tail gas, an optional process gas volume and oxidant below the limiting oxygen concentration (LOC) of the mixture, with the associated benefit of safe operation at high efficiency.

A further aspect relates to a process plant comprising a Claus reaction furnace, a Claus waste heat boiler, a Claus conversion section, a means for sulfur oxidation and a sulfuric acid section, wherein the Claus reaction furnace has a feedstock inlet, a sulfuric acid inlet and an outlet, the Claus waste heat boiler has a gas inlet, a gas outlet and an elemental sulfur outlet, the Claus conversion section has a gas inlet, a gas outlet and an elemental sulfur outlet, the means for sulfur oxidation comprises a material catalytically active in sulfur oxidation and has an inlet and an outlet and the sulfuric acid section has a gas inlet, a gas outlet and a sulfuric acid outlet, and wherein the feedstock inlet of the reaction furnace is configured for receiving a feedstock gas and an oxidant, wherein the outlet of the Claus reaction furnace is configured for being in fluid communication with the gas inlet of the Claus waste heat boiler, wherein the gas outlet of the Claus waste heat boiler is configured for being in fluid communication with the gas inlet of the Claus conversion section and wherein the inlet of the means for sulfur oxidation is configured for being in fluid connection with the gas outlet of said Claus conversion section and wherein the outlet of the means for sulfur oxidation is configured for being in fluid connection with the gas inlet of the sulfuric acid section characterized in the sulfuric acid outlet of the sulfuric acid section in fluid connection with the sulfuric acid inlet of said Claus reaction furnace, with the associated benefit of allowing the design and operation of a Claus tail gas sulfuric acid plant, with significant reduction in support fuel consumption and reduction in size and cost of $SO_2$ oxidation and sulfuric acid condensation steps; and such a process plant having a high thermal efficiency and low support fuel consumption, due to catalytic oxidation of the Claus tail gas at low temperature.

In a further embodiment, the Claus reaction furnace is split into a Claus reaction furnace zone and a sulfuric acid evaporation zone, in which the an amount of feedstock gas, an amount of $O_2$ and optionally an amount of fuel is directed to the Claus reaction furnace zone, providing a Claus reaction furnace zone off gas and the Claus reaction furnace zone off gas and an amount of sulfuric acid is directed to the sulfuric acid evaporation zone, with the associated benefit of a process involving injection of sulfuric acid in a separate sulfuric acid evaporation zone allowing high temperature combustion of said feedstock gas, including impurities, without cooling from evaporation and decomposition of sulfuric acid and providing an energy efficient combined Claus and Claus tail gas plant In a further embodiment, the temperature in the reaction furnace zone outlet is from 50-500° C., preferably 50-200° C., higher than the temperature at the outlet of said sulfuric acid evaporation zone, with the associated benefit of providing energy efficient cooling with less need for heat exchange equipment.

In a further embodiment, the feedstock gas is split in a reaction furnace zone feedstock directed to the reaction furnace zone and a sulfuric acid evaporation zone feedstock directed to the sulfuric acid evaporation zone, with the associated benefit of enabling independent temperature control of the reaction furnace zone and the sulfuric acid evaporation zone.

In a further embodiment, the ratio between the above mentioned reaction furnace zone feedstock and the sulfuric acid evaporation zone feedstock is controlled to maximize the thermal destruction of impurities present in the reaction furnace zone, usually by maximizing the temperature in the reaction furnace zone.

In a further embodiment, the average process gas residence time in the Claus reaction furnace is less than 5 seconds, more preferably less than 2 seconds, with the associated benefit of such a reaction furnace having an appropriate size, while allowing sufficient time for evaporation of sulfuric acid as well as the required partial chemical conversion of $H_2S$ to $SO_2$ and destruction of impurities.

In a further embodiment, the reaction furnace zone and/or the sulfuric acid evaporation zone comprise a turbulence enhancer, with the associated benefit of narrowing the residence time distribution in the reaction furnace zone and sulfuric acid evaporation zone.

In a further embodiment, the sulfuric acid evaporation zone comprises a means of impaction, such as an impaction wall or a chamber packed with inert material, with the associated benefit of destroying droplets by collision, to ensure absence of liquid $H_2SO_4$ in the Claus converter feed gas.

In an alternative process, steps (d) and (e) are carried out sequentially 2-5 times, with the associated benefit of enabling a higher conversion in the process.

In a further embodiment, the material catalytically active in the Claus reaction comprises activated aluminum(III) oxide or titanium(IV) oxide with the associated benefit of such a material providing an efficient process for production of elemental sulfur.

In a further embodiment, step (d) is carried out under a pressure of 200 mbar g to 700 mbar g, a temperature of 200° C. to 350° C. and a space velocity of 800 $Nm^3/h/m^3$ to 3000 $Nm^3/h/m^3$, with the associated benefit of such conditions being efficient for the production of elemental sulfur.

In a further embodiment, step (d) is carried out at a temperature of 100° C. to 150° C. and step (e) involves the step of periodically heating said material catalytically active in the Claus reaction to allow withdrawal of condensed elementary sulfur in a liquid or gas phase, with the associated benefit of the low temperature being beneficial for achieving very high conversion of $SO_2$ and $H_2S$ into elemental sulfur, both due to the low temperature but also since the reaction product is removed, providing even better conditions for high conversion.

In a further embodiment, said material catalytically active in conversion of $SO_2$ to $SO_3$ comprises vanadium, with the associated benefit of such a material providing an efficient process for production of sulfuric acid.

In a further embodiment, said step (g) is carried out under a pressure of 50 mbar g to 200 mbar g, a temperature of 380° C. to 520° C. and a space velocity of 800 $Nm^3/h/m^3$ to 1500 $Nm^3/h/m^3$, per catalyst bed, with the associated benefit of such conditions being efficient for the oxidation of $SO_2$ to form $SO_3$.

In a further embodiment, the amount of sulfur in the recycled stream of sulfuric acid is higher than 1%, 3% or 5% and less than 17%, 21% or 25% of the total amount of elemental sulfur withdrawn from the process. A recycle above the lower limits has the benefit of providing the effect of reduced process gas volume, while the recycle being less than the upper limits avoids a situation where additional fuel must be added to the reaction furnace zone, resulting in extra process volume and operational cost.

In a further embodiment, the sulfuric acid in the recycled stream of sulfuric acid is atomized in said sulfuric acid evaporation zone in two-phase nozzles using compressed air or pressure nozzles and wherein the residence time in the sulfuric acid evaporation zone is at least 0.5 seconds, 1 second or 1.5 seconds, with the associated benefit of such residence times being sufficient for complete evaporation of the sulfuric acid droplets.

In a further embodiment, the residence time in the Claus reaction furnace zone is at least 0.5 seconds or 1 second, with the associated benefit of allowing impurities such as hydrocarbons or $NH_3$ to be destroyed at the high temperature and ensuring an unproblematic operation of the downstream Claus catalytic reactors and sulfur condensers.

In a further embodiment, the molar ratio $H_2S:O_2$ of the components directed to the reaction furnace zone is at least 2.5, with the associated benefit of such a low oxygen feed enabling sub-stoichiometric partial conversion of $H_2S$ to $SO_2$, from the contribution from thermal dissociation of $H_2SO_4$, adding the remaining $O_2$ to obtain the desired $H_2S:SO_2$ ratio of 2.0 in the Claus tail gas.

In a further embodiment, an amount of gas in the process is cooled and directed to an upstream position for controlling the process temperature, with the associated benefit of enabling active control of the temperature of the highly exothermic processes.

In a further embodiment, one or more streams directed to said Claus reaction furnace are pre-heated by heat exchange with a hot process stream, with the associated benefit of minimizing or eliminating the requirements for support fuel to achieve the desired temperature for evaporation of sulfuric acid and conversion of the feedstock.

In a further embodiment, one or more streams directed to said means for sulfur oxidation are pre-heated by heat exchange with a hot process stream with the associated benefit of minimizing or avoiding the requirements for support fuel to achieve the desired temperature for oxidation of sulfur compounds to $SO_2$ and subsequent oxidation of $SO_2$ to $SO_3$.

In a further embodiment, the means for sulfur oxidation is a combination of thermal and catalytic oxidation, with the associated benefit of a Claus tail gas oxidation with a significantly reduced support fuel consumption and oxidized Claus tail gas flow, while being robust towards changes in the concentration of combustibles in the Claus tail gas.

In a further embodiment, at least one of said catalytically active materials for oxidation of $SO_2$ to $SO_3$ or $H_2S$ to elemental sulfur and/or at least one product withdrawn from one of said catalytically active materials are cooled by heat exchange, such as interbed heat exchange or an internally cooled catalytic reactor, with the associated benefit of enabling active control of the temperature of the highly exothermic processes by interbed heat exchange or an internally cooled catalytic reactor such as a boiling water reactor, having a tubular or a thermoplate cooling circuit.

The present invention describes a combination of a Claus and sulfuric acid process, which effectively can produce the amount of sulfuric acid required by a process plant or even avoid production of sulfuric acid and convert excess sulfuric acid to elemental sulfur which may be transported to other sites.

For maximum conversion to elemental sulfur ⅓ of the $H_2S$ must be converted to $SO_2$.

$$H_2S+1.5O_2\text{->}SO_2+H_2O \qquad (1)$$

The stoichiometric ratio between $H_2S$ and $SO_2$ is controlled by controlling the amount of oxygen in the reaction furnace zone. Oxygen is typically supplied by atmospheric air, but can also be $O_2$ enriched air or even pure $O_2$.

The oxygen addition to the reaction furnace zone must also take into account the amounts of $NH_3$, CO, $H_2$ and hydrocarbons in the feed streams.

If the combustion temperature in the reaction furnace zone is less than 1100° C. the conversion of e.g. $NH_3$ may be incomplete. The consequence of this will be a Claus converter feed gas having a potential for formation of ammonia salts, such as $(NH_4)_2SO_4$ and $(NH_4)_2S_2O_3$ which may plug the Claus condenser.

The partially oxidized Claus converter feed gas is then converted to elemental sulfur by the following reactions at a temperature typically above 200° C. in the presence of a catalytically active material, such as activated aluminum(III) oxide or titanium(IV) oxide.

$$2H_2S+SO_2\text{->}\tfrac{3}{8}S_8+2H_2O \qquad (2)$$

Often 2-4 Claus converters are operated in series, to increase the conversion to a maximum, which will increase the cost of a Claus plant.

The control of temperature in the Claus process is important to ensure that elemental sulfur formed in catalytic converter remains gaseous, such that it is condensed in the desired process position only. A further restriction is related to the fact that as the Claus process is exothermic it is beneficial to operate at low temperatures.

An alternative to the above process is the so-called sub-dewpoint Claus process, in which the material catalytically active operates at temperatures where elemental sulfur is not on the gas phase. Such a sub-dewpoint Claus process will require an appropriate scheme for withdrawal of condensed sulfur, e.g. by pulsing of the temperature and purging of elementary sulfur by an inert gas.

Even with 3-4 Claus converters/condensers/reheaters in series it is not possible to reach more than ~98% sulfur recovery, which is insufficient to comply with most environmental legislations. Therefore, the Claus plant is typically equipped with a so-called Claus tail gas solution, where the above mentioned sub-dewpoint process is an example. Numerous tail gas processes exist, having different features. To achieve very high removal efficiencies these Claus tail gas plants become complicated and approach the same cost as the Claus plant itself.

The produced elemental sulfur, does typically not have a direct use in the plants producing the $H_2S$ containing waste stream, but elemental sulfur is simple to transport to other sites and to store for prolonged periods.

A common alternative to the Claus process is the conversion of $H_2S$ to sulfuric acid, e.g. by the so-called wet sulfuric acid process. The sulfuric acid produced may be used in other chemical processes in the plant. A wet sulfuric acid process may also constitute the tail gas cleaning of a Claus process plant. A similar dry sulfuric acid process may also find use in this relation.

The sulfuric acid processes oxidize $H_2S$ to $SO_2$, the $SO_2$ to $SO_3$ and subsequently hydrate $SO_3$ into sulfuric acid, either by reaction with water in the gas phase in the so-called wet sulfuric acid process or by absorption in concentrated sulfuric acid in the so-called contact process or dry process. The reaction temperature during oxidation of $SO_2$ to $SO_3$ will be in the range 370-630° C., in the presence of a catalytically active material, typically comprising vanadium. Typically, the wet sulfuric acid processes produce sulfuric acid having a concentration in the range 92%-98%, whereas dry sulfuric acid processes may also produce sulfuric acid having a concentration in excess of 98%.

In addition, it may also be attractive to collect high pressure steam in the range from 30 barg to 80 barg from the highly exothermic sulfuric acid processes, whereas the Claus process will only provide steam of lower pressure and in significantly lower amounts.

Production of large amounts of sulfuric acid may, however, be less attractive, even though sulfuric acid is traded commercially, as transport of sulfuric acid is complex and regulated.

The reactions taking place in a sulfuric acid process (dry and wet) are:

$$H_2S+1.5O_2 \rightarrow SO_2+H_2O \qquad (3)$$

$$SO_2+0.5O_2 \rightarrow SO_3 \qquad (4)$$

$$SO_3+H_2O \rightarrow H_2SO_4 \qquad (5)$$

All three reactions are exothermal and release 3-4 times more energy compared to the Claus reactions (1) and (2).

The overall reaction of the sulfuric acid process can be described according to $$H_2S+2O_2 \rightarrow H_2SO_4 \qquad (6)$$

The wet sulfuric acid process as an ordinary Claus tail gas solution provides a solution that fulfills the environmental regulations at both lower capital and operating cost than the alternatives. The only disadvantage of the wet sulfuric acid process, so far, has been the sulfuric acid product that is not always desirable.

It has now been realized that the integration of the Claus process and sulfuric acid process may also be carried out by recycle of all or substantially all produced sulfuric acid to the Claus reaction furnace. With the new invention, an integrated Claus/wet sulfuric acid process will remove the disadvantage of an inconvenient sulfuric acid product, and at the same time reduce plant size of both the Claus and wet sulfuric acid process and improve thermal efficiency of the integrated process.

Combustion of sulfuric acid is known from regeneration of spent sulfuric acid in a wet sulfuric acid plant, but has not been practiced in the reaction furnace of the Claus process or under Claus process conditions.

When the sulfuric acid is injected into the sulfuric acid evaporation zone the following overall reaction takes place:

$$H_2SO_4+3H_2S \rightarrow 2S_2+4H_2O \qquad (7)$$

To complete this overall reaction, the following reactions have to be completed:

$$H_2SO_4(liquid) \rightarrow H_2SO_4(gas) \qquad (8)$$

$$H_2SO_4(gas) \rightarrow H_2O(gas)+SO_3(gas) \qquad (9)$$

$$SO_3(gas) \rightarrow SO_2(gas)+0.5O_2(gas) \qquad (10)$$

Reaction (8) is a common evaporation reaction, in which energy required for heating up the liquid and evaporating water and sulfuric acid is supplied by the hot surrounding process gas. An effect of full evaporation of sulfuric acid is that gaseous $H_2SO_4$ is far less corrosive than liquid $H_2SO_4$ droplets.

Reaction (9) is an endothermal dissociation reaction, which occurs almost instantaneously at temperatures above 600° C. At this point some $SO_3$ will start reacting with $H_2S$ to form $SO_2$, $H_2O$ and elemental sulfur.

Reaction (10) is an endothermal decomposition reaction, which is rapid at temperatures above 900° C. In oxygen rich atmospheres, chemical equilibrium prevents complete dissociation, but in reducing atmospheres, the removal of the $O_2$ product (by reaction with $H_2S$) will allow for complete decomposition. The reaction between $H_2S$ and $O_2$ is very fast at these elevated temperatures.

As the residence time in a sulfuric acid evaporation zone is typically 1-2 seconds, it must be assured that the reactions 8, 9, 10 and 1 are completed within this time. When the process gas is cooled, i.e. in the Claus waste heat boiler, the reaction rates dramatically decrease and further conversion will be insignificant.

Presence of $O_2$ and/or $SO_3$ in the process gas contacting the catalyst in the downstream Claus reactors will lead to deactivation of the catalyst due to "sulfation" reaction, where catalytically active aluminum oxide or titanium oxide is converted into catalytically inactive aluminum sulfate or titanium sulfate and thus sulfur formation in these reactors will decrease, leading to an increase in unconverted sulfur species to the downstream tail gas sulfuric acid plant and increased emissions to the atmosphere.

Furthermore, $SO_3$ in the process gas can, during passage through the sulfur condensation units, combine with water and condense and form sulfuric acid in the elemental sulfur product, which can lead to corrosion of process equipment.

To eliminate the risk of any unconverted $SO_3$ from the sulfuric acid evaporation zone causing operational problems in the Claus converters and elemental sulfur condensers, a catalytic reactor can preferably be installed between the outlet of the waste heat boiler and the first sulfur condenser or first catalytic Claus reactor. The catalyst is effective in reducing the content of $SO_3$ to harmless $SO_2$ and/or elemental sulfur by the $H_2S$ and $H_2$ present in the reaction furnace off gas.

If all sulfuric acid produced in the Claus tail gas sulfuric acid process is directed to the sulfuric acid evaporation zone, it is possible to operate a Claus process in which the $H_2S$ abatement employs the very high removal efficiency as well as thermal efficiency of the sulfuric acid plant, but in which the only product is elemental sulfur, which is simple to handle and transport.

In addition, by the recycle of sulfuric acid, $O_2$ is released by the decomposition of $H_2SO_4$, such that the amount of added combustion oxidant will be reduced, which, if the oxidant is atmospheric air, has the benefit of reducing the process volume dramatically, since atmospheric air comprises close to 80% inert $N_2$, i.e. 4 volumes of $N_2$ per volume of 02.

The overall Claus reaction, based on air as $O_2$ carrier to the Claus reaction furnace is:

$$4H_2S+2O_2+8N_2 \rightarrow 2S_2+4H_2O+8N_2 \qquad (11)$$

Similarly, the overall Claus reaction, based on $H_2SO_4$ as the $O_2$ carrier to the Claus reaction furnace is:

$$3H_2S+H_2SO_4 \rightarrow 2S_2+4H_2O \qquad (12)$$

Comparing the two reactions, it is evident that $H_2SO_4$ is an excellent $O_2$ carrier and has the (theoretical) potential to reduce the Claus tail gas volume flow by 67% compared to atmospheric air.

The reactions considering $H_2S$ (reaction 1 and 2) are generally considered fast and will not be rate determining reactions.

As a rule of thumb, a temperature of 1000-1050° C. is required for complete destruction of hydrocarbons, taking into account the effects of slow mixing and temperature/composition gradients. Similarly, 1200-1250° C. is required to ensure proper destruction of $NH_3$ in the reaction furnace.

To reach such high temperatures, especially in the case with feed gases with low caloric value a selection of feed gas preheating, oxygen enrichment, sour gas staging and/or fuel gas co-firing may be required.

With the introduction of sulfuric acid, proper design and operation of the Claus burner and reaction furnace will become more important as the overall effect of injecting sulfuric acid into the Claus reaction furnace is a decrease in temperature, the exact value depends on the feed gas caloric values and the relative amount of sulfuric acid directed to the reaction furnace. Considering around 5% of the total sulfur production is supplied in the form of sulfuric acid, the overall temperature decrease in the Claus reaction furnace will typically be 50-100° C.

The simplest layout is to configure the Claus burner to accept all the feeds and adjust the temperature in the Claus reaction furnace by fuel gas addition and/or make use of e.g. feed gas preheating and $O_2$ enrichment.

However, this can in some cases significantly increase fuel gas consumption, combustion air flow and total process gas flow to an extent at which the Claus and Claus tail gas plants will become too large, resulting in an uncompetitive solution. Furthermore, the increased fuel consumption will increase the operating cost.

It has been realized that establishing a high temperature in a reaction furnace zone with lower $O_2$ stoichiometry than corresponding to the Claus reaction, and directing sulfuric acid into a downstream sulfuric acid evaporation zone, which cools the process gas by the endothermal reactions related to the evaporation, dehydration and dissociation of the sulfuric acid, will provide the necessary temperature for the destruction of hydrocarbon and $NH_3$ while retaining the benefits of the $O_2$ enrichment properties of the sulfuric acid. This is achieved by realizing that as long as the hydrocarbons and $NH_3$ are destroyed in the high temperature reaction furnace zone, the sulfuric acid evaporation zone comprising the sulfuric acid injection does not require the same high temperature as both the $H_2SO_4$ related reactions (7-10) and the direct $H_2S$ related reactions (1-2) will take place at these lower temperatures. A lower temperature will result in a lower equilibrium conversion of $H_2S$ and $SO_2$ into elemental sulfur, however the downstream catalytic converters can compensate for this slightly lower yield of elemental sulfur in the reaction furnace.

The $O_2$ enrichment and process gas cooling effects of sulfuric acid injection result in both a smaller process gas flow and lower process gas temperature to the waste heat boiler and thus it will be possible to use a smaller and cheaper waste heat boiler.

In one embodiment the Claus reaction furnace is configured such that the high temperature reaction furnace zone including the Claus burner receives the full amount of combustion air, the $NH_3$ containing feed gas and at least a fraction of the sour gas and the sulfuric acid evaporation zone is configured for receiving the full amount sulfuric acid and optionally a fraction of the sour gas. This will enable $NH_3$ destruction without fuel gas co-firing as the temperature reducing effect of the sulfuric acid injection is delayed until the $NH_3$ has been destroyed.

The Claus reaction furnace is configured for receiving feed stock gas, oxidant, optional fuel and sulfuric acid in a single zone, reducing the length of the reaction furnace chamber. This layout will be suited for a feed stock gas containing a sufficiently high heating value, such that the reaction furnace temperature is high enough the destroy impurities even when the temperature drop from the sulfuric acid evaporation and dissociation is taking into account. This will also be the preferred layout when the sulfuric acid flow is low and will not significantly decrease the reaction furnace temperature.

The reaction furnace zone operates under very fuel rich conditions, i.e. the $O_2$ input is lower than needed for the complete conversion of all combustibles into $CO_2$, $SO_2$ and $H_2O$. This is normal practice for a Claus reaction furnace as typically only around ⅓ of the $H_2S$ is reacted with the $O_2$. However, with the sulfuric acid injection into the sulfuric acid evaporation zone, the reaction furnace zone operates with even lower $O_2$ input as a considerable amount of the $O_2$ is supplied via the $H_2SO_4$ and to lesser extent via the atomization media in the sulfuric acid evaporation zone. The heat generated in the reaction furnace zone is directly related to the $O_2$ input and the process gas temperature is directly related to the heat generated and the total amount of process gas in the reaction furnace zone. In order to increase the temperature in the reaction furnace zone, the total amount of process gas can be decreased by bypassing a fraction of the sour gas to the sulfuric acid evaporation zone. The amount of sour gas that can be bypassed depends on several factors, such as the heating values of the inlet streams, the extent of preheating of the feed streams, the required reaction furnace zone temperature, the occurrence of impurities in the sour gas and the sulfuric acid evaporation zone temperature.

In e.g. refineries, there will typically be a concentrated sour gas (>80 vol % $H_2S$) and a $NH_3$ and $H_2S$ containing gas (sour water stripper (SWS) gas), where the majority of the sulfur input is present in the sour gas. The reaction furnace zone may then be configured to accept the entire amount of SWS gas and combustion air and an amount of sour gas, such that the reaction furnace zone temperature will be around 1200-1250° C. and complete $NH_3$ destruction is achieved before the sulfuric acid evaporation zone, where the sulfuric acid, any atomization media and remaining sour gas is injected. By this setup, the temperature in the sulfuric acid evaporation zone will be of minor importance as the sour gas contains low concentrations of impurities (such as hydrocarbons) which otherwise would require a certain temperature for complete destruction.

In natural gas processing plants, the feed stock gas to the Claus plant will be less concentrated in $H_2S$ (typically <60 vol %) and will contain hydrocarbons, which require a temperature higher than 1000-1050° C. to ensure complete destruction of the hydrocarbons. In such situation, the preferred option would most likely be to direct the entire amount of sour gas into the reaction furnace zone.

Both the reaction furnace zone and sulfuric acid evaporation zone can have turbulence enhancers installed, such that efficient mixing of the process gas from the reaction furnace zone and the sulfuric acid an optionally a fraction of the sour gas is completed as fast as possible. The turbulence enhancers could e.g. be choke rings, vector walls, tangential inlets etc. which will provide a more narrow residence time distribution for the process gas, enhance mixing, increase evaporation of sulfuric acid droplets and reducing the likelihood of a droplet experiencing a much lower than average residence time.

The sulfuric acid evaporation zone can also be equipped with means of impaction, which can reduce the amount of large droplets, which, due to their high inertia, will not be able to follow the stream lines of the gas, which is diverted close to the obstructions in the means of impaction. Instead the large droplets will continue onwards and collide with the obstruction and evaporate from the obstruction surface. The result is a reduced risk of carryover of unreacted $SO_3$ to the process downstream the waste heat boiler of the Claus reaction furnace, thus avoiding condensation of sulfuric acid in the sulfur condensers and/or deactivation by sulfation of the catalyst in the catalytic Claus converters. Such means of impaction could be checker walls, stumble walls, vector walls, labyrinth walls and compartments of (inert) packing material.

The integrated process according to the present disclosure may also benefit from the use of oxygen enriched air or substantially pure oxygen in the reaction furnace zone. The use of oxygen enriched air has the benefit of reducing the amount of inert nitrogen in the process gas, and thus reducing the process gas volume and thus reduce plant size. The absence of dilution by nitrogen also has the effect of increasing the combustion temperature, which may be beneficial if impurities are present which need complete conversion, especially since the amount of oxygen in the Claus reaction furnace is sub-stoichiometric. Since the Claus catalyst is sensitive to presence of impurities, such as light hydrocarbons it may often be beneficial to operate the Claus reaction furnace with oxygen enriched air to achieve an elevated temperature for complete oxidation of impurities. This also has the further benefit of enabling an initial homogeneous non-catalytic Claus conversion, which may take place at temperatures above 900° C.

From a thermal efficiency perspective, the high combustion temperature may however be limited by the choices of construction materials in the Claus reaction furnace and downstream waste heat boiler. For highly concentrated $H_2S$ feed gases, oxygen enrichment may increase the process gas temperature above the design temperatures for the materials. A combination of $H_2SO_4$ recycle (which cools the process gas by evaporation and acid decomposition) will however make use of enriched $O_2$ in such a layout possible.

The means for sulfur oxidation in the Claus tail gas plant may typically be an incinerator, operated with atmospheric air as $O_2$ source, and in addition it may also be beneficial to direct gases with a low concentration of sulfur species to the incinerator as complete combustion of the sulfur species release considerably more energy than the partial oxidation taking place in the Claus reaction furnace. Such an arrangement will reduce support fuel consumption, making the tail gas sulfuric acid plant more thermally effective. A possible drawback is that the additional sulfuric acid produced cannot be directed to the Claus reaction furnace without the need for support fuel in the Claus reaction furnace to supply the energy for the evaporation and dissociation of the sulfuric acid. With a two-zone reaction furnace with sulfuric acid injection into the sulfuric acid evaporation zone, the capacity for sulfuric acid injection has increased significantly compared to the single zone Claus reaction furnace.

As a consequence, it may be beneficial to direct feedstock gases comprising high concentrations of $H_2S$ to the Claus plant, while by-passing the less concentrated feedstock gases as well as feedstock gases comprising $NH_3$ to the Claus tail gas incinerator.

If the Claus tail gas incinerator only receives a Claus tail gas comprising only a limited amount of $H_2S$, the calorific value is too low to sustain a stable combustion. In that situation addition of a support fuel is required. This support fuel may either be $H_2S$, SWS gas or a hydrocarbon feed, but preferably an amount of an existing feedstock gas to the integrated Claus and sulfuric acid plant is used. If the support fuel is not readily available or the increased sulfuric acid production cannot be handled in the Claus reaction furnace or exported, a catalytic solution for the Claus tail gas oxidation will be an alternative.

The integration between the Claus process and the sulfuric acid process allows for integration benefits. These include the possibility to reduce the volumetric flow in the Claus process, by providing oxidant in the form of sulfuric acid, which can replace atmospheric air. In addition, the use of feedstock gas may be optimized such that feedstock gases comprising fuels contributing highly to sulfur production may be directed to the Claus process, whereas feedstock gases contributing with thermal energy and non-reacting products such as $CO_2$ may be directed to the sulfuric acid process. Where the process is designed for recycle of a too high amount of sulfuric acid, additional fuel may be required for providing the heat required for evaporation and dissociation of sulfuric acid.

In a preferred embodiment, the sulfuric acid produced in the Claus tail gas sulfuric acid plant is cooled and directed to an intermediate storage tank. In principle, the sulfuric acid storage tank can be omitted as the Claus reaction furnace is designed to accept the entire sulfuric acid production from the sulfuric acid plant. However, in order to ensure high reliability of the overall plant, the installation of the tank allows for (short time) operation of the Claus plant without sulfuric acid injection while the sulfuric acid plant is still in operation. Such situations can arise during start-up and shut-down and if maintenance of the sulfuric acid lances/nozzles is required. The tank will also enable withdrawing sulfuric acid product, should this become a desired product and also allow import of sulfuric acid from other sources.

A tank capacity for 4-120 hours of sulfuric acid production is a good compromise between tank cost and Claus+ Claus tail gas sulfuric acid plant flexibility.

In another embodiment, the sulfuric acid produced in the Claus tail gas sulfuric acid plant is further concentrated in an acid concentrator before recycled to the Claus reaction furnace. The operation of such a concentrating plant will require energy to evaporate water from the sulfuric acid, but much of this energy is then saved in the sulfuric acid evaporation zone. The benefit of this embodiment is a lower decrease in process gas temperature in the sulfuric acid evaporation zone and a decrease of process gas flow through the Claus plant and Claus tail gas plant.

The integration of the two processes also enable a process where the operation of the Claus process is carried out with a low conversion such as 90% or 95%—since it may be cheaper to carry out the additional conversion in a sulfuric acid process compared to the addition of an extra Claus converter stage.

A standard Claus plant layout requires >50 vol % $H_2S$ in the feed gas to be thermally self-sustainable in the Claus reaction furnace. With lower $H_2S$ concentrations, feed gas preheating and so-called split flow configuration is required. Claus plants treating feed gases with <10-20 vol % $H_2S$ are rarely seen. Sulfuric acid processes, on the other hand, very efficiently treat these so-called lean $H_2S$ gases, producing concentrated sulfuric acid. The sulfuric acid product will be highly concentrated in sulfur and oxygen.

A combination of a sulfuric acid plant to treat a lean $H_2S$ (and/or other sulfur compounds) gas with a Claus plant treating a rich $H_2S$ gas and accepting the acid from the sulfuric acid plant will be a beneficial setup as the feed streams to both the Claus plant and sulfuric acid plant are optimal with regard to conversion efficiency, thermal efficiency and plant size/cost.

The coupling between the Claus process and a sulfuric acid process may also be used to optimize the treating of feeds. Sulfuric acid processes and in particular the wet sulfuric acid process has the benefit of being well suited for contaminated feeds, including SWS gases comprising ammonia as discussed above, "dirty sulfur" comprising organic impurities and moderate amounts of inorganic impurities, dilute streams of $H_2S$, $SO_2$ and other sulfur compounds, including flue gases from burners and FCC gas. Similarly, rich $H_2S$ gases, which must be diluted before being treated in a wet sulfuric acid plant, may instead be directed immediately for the Claus process.

A common means for sulfur oxidation in the Claus tail gas is a thermal incinerator, treating the full flow of Claus tail gas. In the Claus tail gas incinerator, all sulfur compounds will be oxidized to $SO_2$ and a few percent of the $SO_2$ will be further oxidized to $SO_3$. To ensure complete oxidation of CO and $H_2$, the incinerator temperature is typically 850-1000° C. As the heating value of the Claus tail gas is too low to sustain a stable flame, fuel gas addition is required. The fuel gas is typically hydrocarbon based (e.g. natural gas), but could also be feed gases to the upstream Claus plant such as $H_2S$ containing gas and so-called sour water stripper gas, also comprising $NH_3$. Using sour water stripper gas as fuel will generate NOR, which is effectively removed in a SCR reactor, which can be located upstream the $SO_2$ converter. $NH_3$ for the SCR reaction can be supplied from an external storage or it can be taken from the sour water stripper gas.

As the Claus tail gas is $O_2$ free, $O_2$ must be added, typically in the form of atmospheric air.

The off gas from the Claus tail gas incinerator is cooled in one or two steps to reach a temperature of 370-450° C., which is the typical inlet temperature to a $SO_2$ converter, in which $SO_2$ is catalytically converted to $SO_3$ by reaction with $O_2$ in the presence of a catalytically active material comprising vanadium oxide.

Upstream the $SO_2$ converter it may be necessary to add $O_2$ in the form of atmospheric air—the incinerator is usually designed to operate with low excess $O_2$ in the off gas and it may not be feasible to add extra air to the incinerator to increase the $O_2$ concentration as it will increase fuel consumption.

In the $SO_2$ converter 1-3 catalyst layers are installed, with integrated cooling, typically by a heat exchanger positioned below each layer is to remove heat of reaction and control the inlet temperature to the next catalyst layer. These interbed heat exchangers typically use high pressure steam as cooling media, but high pressure water, molten heat transfer salt, process gas and air can also be used. The $SO_2$ oxidation catalyst is vanadium based. The $SO_2$ conversion efficiency in the $SO_2$ converter is typically above 99%, ensuring more than 99.9% total sulfur removal from the feed gases.

The $SO_2$ converter off gas is cooled and directed to a sulfuric acid condenser in which the gas is further cooled, $SO_3$ reacts with $H_2O$ to form $H_2SO_4$ and condenses as concentrated sulfuric acid with a concentration in the range 90-98% w/w. The hot concentrated sulfuric acid is withdrawn from the condenser, cooled in a recirculation loop and pumped to the storage tank. From there it can be transferred to the Claus plant and injected into the Claus reaction furnace for evaporation and decomposition and formation of elemental sulfur.

The cooled gas leaving the sulfuric acid condenser is substantially free of sulfuric acid and can be directed to the stack or units for further reduction of sulfuric acid mist and/or $SO_2$.

The cooling media in the sulfuric acid condenser is atmospheric air, which indirectly receives heat from the process gas, by heat exchange through a glass wall, typically a tube. The cooling air can be either on the inside or outside of the tube and will leave the condenser at a temperature between 180° C. and 270° C. A part of the hot air can be used as combustion air in the incinerator and/or added upstream the $SO_2$ converter to provide $O_2$ for the $SO_2$ to $SO_3$ oxidation.

With the incinerator operating at 850-1000° C., a substantial amount of energy must be supplied to the process. Support fuel is the typical energy source, however the combustion of the support fuel requires addition $O_2$ (in the form of air) with the consequence of increasing the process gas flow out of the incinerator and thus increasing the size and cost of the downstream equipment. Furthermore, the support fuel can be expensive and maybe even unavailable. Commonly used means for lowering the energy input to the incinerator in the form of support fuel is e.g. preheating of the Claus tail gas and/or combustion air.

In a wet type sulfuric acid plant, up to 90%-100% of the energy released can be recovered as high pressure steam, which may justify the use of support fuel. However, if steam is of low value or has limited use, the sulfuric acid plant layout can be optimized for minimum support fuel consumption. The best way to accomplish that is by lowering the oxidation temperature for the sulfur compounds in the Claus tail gas and for that purpose a sulfuric acid plant layout with a semi-catalytic or fully catalytic Claus tail gas oxidation has been invented.

It has been realized that significant support fuel savings can be achieved by combining thermal incineration of a smaller fraction of the Claus tail gas with a catalytic oxidation step, providing a semi-catalytic Claus tail gas oxidation means. Such semi-catalytic oxidation means will have the same features of the thermal means for Claus tail gas oxidation, however consuming less than 50% of the support fuel and providing a reduced process gas flow to the downstream $SO_2$ oxidation and sulfuric acid condensation steps, significantly decreasing both operating and capital cost.

In the semi-catalytic oxidation layout, the Claus tail gas is preferably preheated and divided just upstream the thermal incinerator: a smaller fraction is directed to the incinerator for thermal destruction of the sulfur containing compounds (and $H_2$ and CO) and the larger fraction is bypassed the incinerator and mixed with the hot incinerator off gas.

The 850-1,000° C. off gas from the incinerator is mixed with the bypassed (preheated) Claus tail gas, producing a semi-oxidized process gas with $H_2S$, $S_8$, COS, $CS_2$, CO and $H_2$ from the Claus tail gas, but with lower concentrations and higher temperature due to the combination with the hot incinerator off gas, substantially free of $H_2S$, $S_8$, COS, $CS_2$, CO and $H_2$. The mixing temperature is typically in the 400-750° C. range and at this temperature, $H_2S$ and $CS_2$ will become readily oxidized by homogeneous gas phase reactions, provided there is sufficient $O_2$, residence time and efficient mixing of the gases. To reduce size and fuel gas consumption, the incinerator is typically operated with 2-4 vol % excess $O_2$ in the incinerator off gas. The bypassed Claus tail gas does not contain $O_2$ and therefore it may be necessary to add additional (preheated) air in the mixing zone. As efficient mixing of the 2-3 streams is important, a means for mixing enhancement is preferred. Such means can be as simple as tangential inlet flows of the smaller stream into the incinerator off gas or consist of internal structures in the process gas duct, such as deflection plates, choke rings and vector walls. To provide time for mixing and homogeneous gas phase reactions, the homogeneous reaction zone can be an extension of the incinerator combustion chamber with a residence time of 0.5 to 2 seconds. The brick lining of the combustion chamber will easily sustain the process gas temperatures both before and after the homogeneous reactions, but metallic ducts are also possible.

The combustible gases in the Claus tail gas, relevant for homogeneous oxidation are $H_2S$ and $CS_2$. Above 400° C., $H_2S$ will readily oxidize to $SO_2$ and $H_2O$ and $CS_2$ will oxidize to COS and $SO_2$. $H_2$ and CO will require temperatures above 600-700° C. to oxidize homogeneously and will usually not be oxidized to any significant extent. COS can oxidize in the 500-600° C. temperature range, but the concentration of COS is typically too low to be of practical importance for the process layout.

The COS, CO and $H_2$ remaining after the homogeneous reactions have been completed, will require catalytic oxidation and thus this semi-oxidized process gas must be cooled to the optimal oxidation catalyst temperature. The gas cooling can be carried out using e.g. a steam generating waste heat boiler, a steam super heater, a gas/gas heat exchanger or any other heat exchanger alone or in combination. Including a steam generating waste heat boiler just downstream the homogeneous reactions zone will be advantageous as a waste heat boiler is highly robust towards fluctuations in inlet temperature, such that the waste heat boiler outlet temperature fluctuations are significantly reduced. This is beneficial in the case of offset situations in the Claus plant, suddenly increasing the $H_2S$ concentration in the Claus tail gas and thus increasing the temperature at the outlet of the homogeneous reaction zone. The temperature increase of the waste heat boiler is significantly reduced, allowing the downstream plant to operate close to normal operating parameters.

The catalytic oxidation of $H_2$, COS, $CS_2$ and CO is carried out using a noble metal doped catalyst, which must be resistant to sulfur compounds. Such a catalyst is e.g. described in EP 2878358, and will typically comprise V, Ti and Pd or Pt and will typically be a structured catalyst, such as a monolith. Typically, such catalysts are active for oxidation of $H_2$, COS, $CS_2$ and $H_2S$ and CO above 200-320° C., but may be damaged by long term operation above 500° C.

The temperature increase in the catalytic oxidation reactor will preferably bring the process gas temperature to the desired value for the downstream $SO_2$ converter and $SO_2$ oxidation catalyst, typically in the range 370-450° C. The temperature increase in the catalytic oxidation reactor may be controlled by the fraction of Claus tail gas bypassing the incinerator and/or the degree of heat removal in the heat exchanger(s) between the incinerator outlet and catalytic oxidation reactor inlet.

The oxidation catalysts have an operating temperature interval, characterized by practically no catalytic activity at temperatures below the minimum (inlet) temperature and risk of catalyst degradation (chemically and/or mechanically) at temperatures above the maximum allowable (outlet) temperature. The temperature ranges are specific for each catalyst and compound to be oxidized.

In the $SO_2$ converter, one or more catalyst layers are installed to ensure the required oxidation of $SO_2$ to $SO_3$, such that the emissions targets can be reached. As the $SO_2$ oxidation reaction is exothermal and reversible, heat has to be removed in order to achieve optimal thermodynamic conditions for the $SO_2$ conversion. Usually heat is withdrawn in heat exchangers installed between the catalyst layers, using steam generators, steam super heaters and/or gas/gas heat exchangers, while ensuring that the cooling media always stays above the sulfuric acid dew point temperature in the process gas.

$O_2$ is consumed in the incinerator, the homogeneous reaction zone, the catalytic oxidation reactor and the $SO_2$ converter and this $O_2$ is supplied as atmospheric air or $O_2$ enriched air to the incinerator and/or added in a position between the outlet of the incinerator and the inlet of the catalytic reactors. To reduce fuel consumption in the incinerator and lower heat exchanger cost, the largest possible fraction of the necessary air is added just upstream the catalytic oxidation reactor. In principle, this air could be further split between the catalytic oxidation reactor and the $SO_2$ converter, but the increased complexity of the plant due to two air control systems will most likely outscore the benefits of a slightly lower process gas flow through the catalytic oxidation reactor.

Another implication of the $O_2$ supply to the Claus tail gas is to ensure that the resulting mixture of Claus tail gas, comprising combustible gases, incinerator off gas and air, comprising $O_2$, will not form an explosive mixture, with the associated risk of causing an uncontrolled oxidation (explosion) in the plant. This can be avoided by ensuring that the concentration of combustible gases is safely below the so-called lower flammability level, LFL, or the concentration of $O_2$ is below the so-called Limiting Oxygen Concentration, LOC. Staying below the LFL of the mixture requires dilution of the Claus tail gas by large amounts of process gas from the incinerator and/or the $O_2$ containing gas, typically air. Staying below the LOC of the mixture require good control of the addition of $O_2$, such that it will not exceed the safe value. Avoiding explosive mixtures by operating below the LOC value will typically require adding the $O_2$ containing gas in one or more stages.

The choice of strategy is best made with knowledge about the composition of the Claus tail gas and the altitude of fluctuations of combustibles which are likely/possible in the Claus tail gas. An upset condition in the upstream Claus plant could result in an increase in concentration of combustibles, e.g. $H_2S$ which will increase the heating value of the gas and thus increase energy release in the process, increasing process gas temperatures. Care must be taken to design the plant sufficiently robust, such that the equipment and catalysts can withstand a given additional increase in temperature. This is especially relevant for the catalyst for oxidation of $H_2S$, $H_2$, CO, $CS_2$, CO and $S_x$. The semi-catalytic sulfuric acid plant layout is robust towards such fluctuations as a large fraction of the combustibles gases are oxidized in the incinerator and in the homogeneous reaction zone upstream the process gas cooling in the waste heat boiler. The waste heat boiler is robust against an increase in inlet temperature. In a well-mixed process gas, comprising the bypassed Claus tail gas and the incinerator off gas, and a surplus of $O_2$, homogeneous oxidation of $H_2S$ and $CS_2$ (to COS) will for practical purposes take place at 400° C. and higher. $H_2$ and CO will require temperatures well above 600-700° C. for homogeneous oxidation of the species to be of industrial relevance.

The $SO_3$ gas leaving the $SO_2$ converter is substantially free of $S_8$, $H_2S$, COS, $CS_2$, $H_2$ and CO. The $SO_3$ will combine with $H_2O$ in the process gas to form $H_2SO_4$ vapor, which then condenses as concentrated sulfuric acid in the indirectly cooled sulfuric acid condenser. The condensed sulfuric acid is in the 90-98.5% w/w $H_2SO_4$ concentration range, depending on the $H_2O$ to $SO_3$ ratio in the process gas. Claus tail gases generally have high $H_2O$ concentrations (>20 vol % $H_2O$) and thus 90-94% w/w $H_{2SO4}$ is the expected acid concentration. The concentrated sulfuric acid is withdrawn from the sulfuric acid condenser, cooled and sent to a sulfuric acid storage tank.

If desired, the concentrated sulfuric acid could be even further concentrated before sent to the storage tank, such that 96-98.5% w/w is stored. There will be a small benefit in reducing the water injection, originating from a less concentrated sulfuric acid, into the Claus reaction furnace, but as concentration of acid is quite energy consuming, the overall energy consumption of the whole plant will most likely increase.

The sulfuric acid concentration from the sulfuric acid condenser could also be increased by reducing the $H_2O$ concentration in the process gas. The Claus tail gas typically contains 25-30 vol % $H_2O$ and reducing the $H_2O$ concentration will not only increase the sulfuric acid concentration but also reduce the process gas flow in the sulfuric acid plant significantly. However, the cost of reducing the water concentration in the process gas is very high as the process gas temperature should be decreased to below 50-60° C. to condense most of the water and furthermore the water would be contaminated with elemental sulfur, $H_2S$, $SO_2$ and/or $H_2SO_4$ and would thus require further treatment.

The cooled gas leaving the sulfuric acid condenser is substantially free of $SO_3$ and $H_2SO_4$ and can be directed to the stack. In some cases, additional units for $SO_2$ and acid mist removal may be required, such as $SO_2$ scrubbers and wet electrostatic filters.

Atmospheric air is typically used as cooling media in the sulfuric acid condenser and most of the heat recovered from the $SO_3$ gas cooling and acid condensation is used in the sulfuric acid plant, e.g. as heated combustion and oxidation air and for preheating boiler feed water or the Claus tail gas.

The concentrated sulfuric acid produced in the sulfuric acid condenser is pumped from the sulfuric acid storage tank to the Claus reaction furnace, where the sulfuric acid is sprayed into the furnace as a fine mist, such that fast evaporation of the liquid is achieved and the well-known Claus reaction can commence. The smallest droplets are achieved by using two-phase (pneumatic) nozzles, in which compressed air, $N_2$, steam or any other gas is used to "cut" the sulfuric acid into very fine droplets. Hydraulic (pressure) nozzles can also be used, however the droplets are somewhat larger and will require longer evaporation time.

Should the $SO_2$ converter or sulfuric acid condenser safety shut down due to operating condition out of bounds (=trip), it will be possible to bypass the process gas from the catalytic oxidation reactor directly to the stack, such that the incinerator can be kept in operation and thus the Claus plant can be kept in operation too. If the restrictions on (temporary) emissions allows it, the process gas upstream the catalytic oxidation reactor could be bypassed to the stack.

It has been realized that by combining two catalytic reactors, comprising different oxidation catalysts with different properties with process gas recycling and staged $O_2$ addition, the oxidation of Claus tail gas can be carried out without thermal incineration and thus without use of support fuel, significantly reducing the operating cost of the Claus tail gas treatment plant.

The fully-catalytic Claus tail gas oxidation sulfuric acid plant layout will enable Claus tail gas treatment without the use of an incinerator. However, it may be desired to have an incinerator operating in a hot standby mode, such that the Claus tail gas can be quickly directed to the incinerator, should the sulfuric acid plant be forced to an unplanned shutdown. Under normal operation the incinerator can operate in a hot standby operation with minimum fuel gas consumption, thus saving fuel compared to the normal operation in a Claus process layout in which the entire Claus tail gas is directed to the incinerator to be heated to 800-900° C.

The fully-catalytic Claus tail gas oxidation sulfuric acid plant will in most cases be able to operate without support fuel consumption as there will be sufficient energy released in the catalytic oxidation of $H_2$, CO, $H_2S$, COS, $CS_2$ and $S_8$ to $H_2O$, $CO_2$ and $SO_2$ and $SO_2$ to $SO_3$ at 200° C. to 500° C. in the Claus tail gas. The main contributors to the heating value of the Claus tail gas are $H_2S$, $H_2$ and CO. Should the heating value in the Claus tail gas become too low, a small fraction of the feed gas to the Claus plant can be directed to the Claus tail gas plant and in that way increase the heating value. Another way of increasing the heating value of the Claus tail gas is to deliberately lower the conversion in the Claus plant. This can be done by e.g. increasing the $H_2S/SO_2$ ratio and/or operate the Claus catalytic reactors with non-optimal temperatures (usually increasing inlet temperatures).

Support fuel addition to the Claus tail gas in the form of natural gas ($CH_4$) or other light hydrocarbons will not be a good solution as especially the $CH_4$ molecule is very stable and will usually not oxidize at the foreseen operating temperatures and catalyst types. Suitable support fuels will be fuels containing $H_2$, CO and/or $H_2S$, which are already available in the Claus tail gas and easily oxidized on the foreseen catalysts.

The fully catalytic oxidation sulfuric acid plant will be equipped with heaters for starting up the plant and will typically not be in service during normal operation. However, should the heating value of the Claus tail gas become too low, these heaters can be put in operation. The heaters can be burners (using e.g. natural gas), electrical heaters and/or heat exchangers receiving energy from an external plant.

Although normally sufficiently high for the fully catalytic Claus tail gas oxidation sulfuric acid plant, the heating value of the Claus tail gas is still considered low and thus a very heat efficient layout of a sulfuric acid plant is required, i.e. a considerable fraction of the energy released by the oxidation of reduced species in the Claus tail gas ($H_2$, CO, $H_2S$, COS, $CS_2$), oxidation of $SO_2$ and conversion of $SO_3$ into concentrated sulfuric acid must be used for heating up the Claus tail gas and the air required for the oxidation reactions.

The Claus tail gas and optionally the pit vent gas are preheated by excess heat from the sulfuric acid plant, preferably in the form of high pressure steam or hot cooling air from the sulfuric acid condenser. As the Claus tail gas does not contain $O_2$, $O_2$ must be supplied to the tail gas for the oxidation reactions to proceed. Preferably atmospheric air is used as the $O_2$ carrier, but $O_2$ enriched air and/or recycled process gas from the sulfuric acid plant is also an option.

Adding air to the Claus tail gas is not trivial as formation of explosive mixtures is possible and this risk must be minimized/eliminated. Especially the content of $H_2$ and $H_2S$ are relevant for forming explosive mixtures as these compounds have Lower Flammability Limits, LFL, of ~4-5 vol % at room temperature, decreasing to 3-4 vol % when the Claus tail gas is heated to ~200° C. A general rule states that the concentration of combustibles must not exceed 25% of the lower flammability limit, i.e. the sum of CO, $H_2$ and $H_2S$ concentrations should not exceed 0.7-1 vol % after mixing with air. In some industries it is allowed to operate with concentrations up to 50% of the LFL. Dilution of the Claus tail gas can result in a substantial amount of air addition, which increase the process gas flow and thus make all parts of the sulfuric acid plant larger. Furthermore, the energy balance would be compromised as the added dilution air would require energy to be heated up and thus support fuel addition or addition of energy from external sources may become necessary. Another option would be to dilute the Claus tail gas with process gas recycled from a position downstream the catalytic oxidation reactors. This option will efficiently dilute the process gas to below the LFL limit, while limiting the process gas volume increase to only a smaller part of the plant, compared to the entire plant as a result of dilution with atmospheric air.

Furthermore, the energy balance will not be compromised as the energy is retained within the plant.

Another energy efficient approach is to exercise staging of $O_2$ addition to the Claus tail gas, such that the $O_2$ concentration always can be kept below the so-called Limiting Oxygen Concentration, LOC. Below this $O_2$ concentration, the mixed gas will be non-flammable, independent of the concentration of combustibles. By using $O_2$ staging, the oxidation of the reduced species in the Claus tail gas can be carried out with minimum $O_2$ addition, thus minimizing plant size and eliminating the requirement for external energy supply via e.g. support fuel addition and (electrical) heaters. This approach also has the benefit of simple control as only the amount of oxygen containing gas needs to be controlled, such that operation below the LOC is always achieved. Dilution with gas to stay below the LFL will depend on the concentration of combustibles, which can fluctuate over time or can have off sets, quickly increasing the concentration of combustibles. At room temperature the LOC values for $H_2S$, CO and $H_2$ are 6.5 vol %, 5.0 vol % and 4.5 vol %, respectively. As the temperature increase, the LOC value will decrease. It is common practice to operate with 2-3 vol % lower $O_2$ concentration than the LOC value, the limit depends on whether the $O_2$ concentration is measured or only calculated. In offset situations, in which the combustible concentration increases, there is a risk of consuming all $O_2$, forming a reducing atmosphere. In reducing atmospheres there is a risk of formation of elemental sulfur, which can condense in undesired locations and there is a risk of deactivating the oxidation catalysts.

For optimal operation of the catalytic oxidation steps, the operating temperatures must also be firmly controlled, such that the inlet temperature is above the ignition temperature of the catalyst and the outlet temperature is below the maximum design temperature of the catalyst (e.g. to avoid mechanical damage or chemical deactivation). To control these temperatures recycling of already converted process gas can be utilized. The temperature can in principle also be controlled by simple air dilution, but air addition is also constrained by flammability limits. Furthermore, recycling is favored over simple dilution as simple dilution increases the process gas flow in all process equipment, whereas recycling of process gas limits the increase in process gas flow to a limited number of process equipment. Examples of ignition temperatures and maximum operating temperatures can be found in e.g. EP 2878358.

In a preferred layout the preheated Claus tail gas and sulfur pit vent gas are mixed with preheated atmospheric air, such that the $O_2$ concentration is below the Limiting Oxygen Concentration limit, and then directed to a first catalytic oxidation reactor. The catalyst is characterized by not containing noble metals and thus only carries out partial oxidation of the combustible compounds in the process gas. The catalyst oxidizes $H_2S$ to $SO_2$ and $H_2O$ and $CS_2$ to COS and $SO_2$, while COS, CO and $H_2$ pass almost unreacted through the catalyst. The advantage of this catalyst is that it has a significantly lower ignition temperature than a noble metal based oxidation catalyst (see EP 2878358). The heat evolved in the first oxidation reactor increases the process gas temperature to such an extent that the temperature is above the ignition temperature of the second oxidation catalyst, which fully converts all reduced species (primarily COS, CO and $H_2$) to $SO_2$, $H_2O$ and $CO_2$. The second oxidation catalyst is characterized by comprising noble metals, such as e.g. Pd and Pt. The distribution of reactions over two catalysts also provides the benefit of distributing the heat released over a higher volume. The heat evolved from the oxidation of all combustibles in the Claus tail gas will typically result in a temperature increase too high for a single catalyst, i.e. the maximum catalyst outlet temperature will most likely be exceeded.

It may be necessary to supply extra $O_2$ upstream the second oxidation reactor, either as staging to keep the $O_2$ concentration below the LOC value or by dilution to keep the combustible concentration well below the LFL. In situations with high $H_2S$ concentration in the Claus tail gas, the heat evolved in the first oxidation reactor may result in a too high outlet temperature to be fit for the inlet of the second oxidation reactor and thus it may be necessary to install a heat exchanger between the first and second oxidation reactors.

To control the outlet temperature of the second catalytic reactor, a process gas recirculation loop is preferably applied, the loop can be equipped with temperature control (heat exchanger), such that the temperature at the inlet of the second oxidation reactor can be controlled at the same time. A blower is required in the recirculation loop.

EP 2878358 describes a once-through catalyst system without heat exchangers, $O_2$ addition and temperature control between the catalysts as the particular catalyst system was designed for a $O_2$ rich gas containing lower concentrations combustible compounds compared to the Claus tail gas.

U.S. Pat. No. 4,171,347 describes a catalyst and process for selective oxidation of $H_2S$ to $SO_2$ in a process gas also containing $H_2$ and CO, i.e. without oxidizing the $H_2$ and CO. To lower the temperature of the process gas during or after oxidation of the $H_2S$, cooling by cold air addition in the catalytic reactor, recirculation of converted process gas and dilution with air are suggested. However, the patent does not realize the influence of homogeneous reactions taking place or consider the risk of forming explosive mixtures when diluting the feed gas with air. Furthermore, the further treatment of the converted substantially $H_2S$ free process gas comprising CO and $H_2$ is not considered.

Downstream the second oxidation reactor all sulfur containing species are in the $SO_2$ form, possibly with a few percent converted into $SO_3$. The $SO_2$ gas is then optionally adjusted in temperature and/or $O_2$ concentration by passing the process gas through a heat exchanger and adding preheated air, such that the desired temperature and $O_2$ to $SO_2$ ratio is achieved at the inlet to the $SO_2$ converter. The process gas temperature can also be adjusted by the preheated air temperature, thus eliminating the need for a heat exchanger on the process gas stream—such layout optimization will depend on the concentration of the combustibles in the Claus tail gas and air addition to the upstream catalytic reactors. If the air preheating involves heat exchange with the partially or fully converted process gas, it must be ensured that the air temperature is above the sulfuric acid dew point temperature in the process gas. If not, there is a risk that sulfuric acid will condense on the surface of the air heater, causing corrosion of the heat exchanger material and possible leakage, possibly increasing emissions through the stack.

In the $SO_2$ converter, $SO_2$ is oxidized to $SO_3$ by means of a vanadium based catalyst installed in one or more catalyst layers with heat exchangers installed between the layers. The required conversion efficiency determines the number of catalyst layers, but typically 1-3 layers are necessary. The $SO_3$ gas leaving the $SO_2$ converter is passed to a sulfuric acid condenser in which the process gas is cooled indirectly with atmospheric air, sulfuric acid is condensed and withdrawn and cleaned process gas is directed to the stack. The hot cooling air from the sulfuric acid condenser is used in the sulfuric acid plant as an $O_2$ source, thereby utilizing the heat withdrawn in the condenser in the sulfuric acid plant.

The sulfuric acid is cooled and pumped to a sulfuric acid storage tank from which the sulfuric acid is pumped to the Claus reaction furnace for decomposition and reformation to elemental sulfur in the Claus plant.

An alternative to the two-stage catalytic oxidation reactors with air staging, mixing and heat exchange between the reactors, is a cooled reactor in which both catalysts are positioned in the cooled reactor and the internal cooling ensures that the catalysts are operating within the range of minimum and maximum temperatures.

If it becomes too difficult to stay below the LFL and/or LOC in this cooled reactor, an alternative is to use two reactors in series and have at least one of them being cooled. The first catalytic reactor is most suitable for being cooled as the heat evolvement is typically highest and fluctuations in the heating value will typically be from $H_2S$, which will be oxidized in the first catalytic reactor and thus the risk of overheating the catalyst in the second catalytic reactor will be lower.

As the heating value of the Claus tail gas is relatively low, the internal recovery of the reaction energy released within the sulfuric acid plant is of high importance and thus the optimal combination of air staging, air dilution, process gas recirculation and position of heat exchanger(s) will depend on the exact amount of the combustibles in the Claus tail gas. Also any deviations in the heating value of the Claus tail gas must be taken into account as such deviations will change the temperature and $O_2$ profiles in the sulfuric acid plant. It may be that a non-optimal design, with regard to the normal Claus tail gas composition, may be preferred in order to be able to operate the sulfuric acid plant safely should the heating value suddenly increases, e.g. as a result in changes in the feed gas composition to the Claus plant or poor $O_2$ control in the Claus plant. Such design will typically involve larger than necessary process gas recirculation as that is an efficient method for suppressing temperature increases in the catalytic oxidation reactors to protect the catalyst from overheating.

As the Claus tail gas incinerator is decoupled from the fully-catalytic sulfuric acid plant, a start-up heater will be required, to heat the process gas to the required temperature of 200-400° C., i.e. the minimum ignition temperatures of the different catalysts. The heater could be both a fired heater, a heat exchanger with hot media from an external source or an electric heater. The position of the start-up heater is preferably upstream the second catalytic oxidation reactor, but could also be upstream the first catalytic oxidation reactor or in the process gas recirculation loop.

FIGURES

Figure 1:
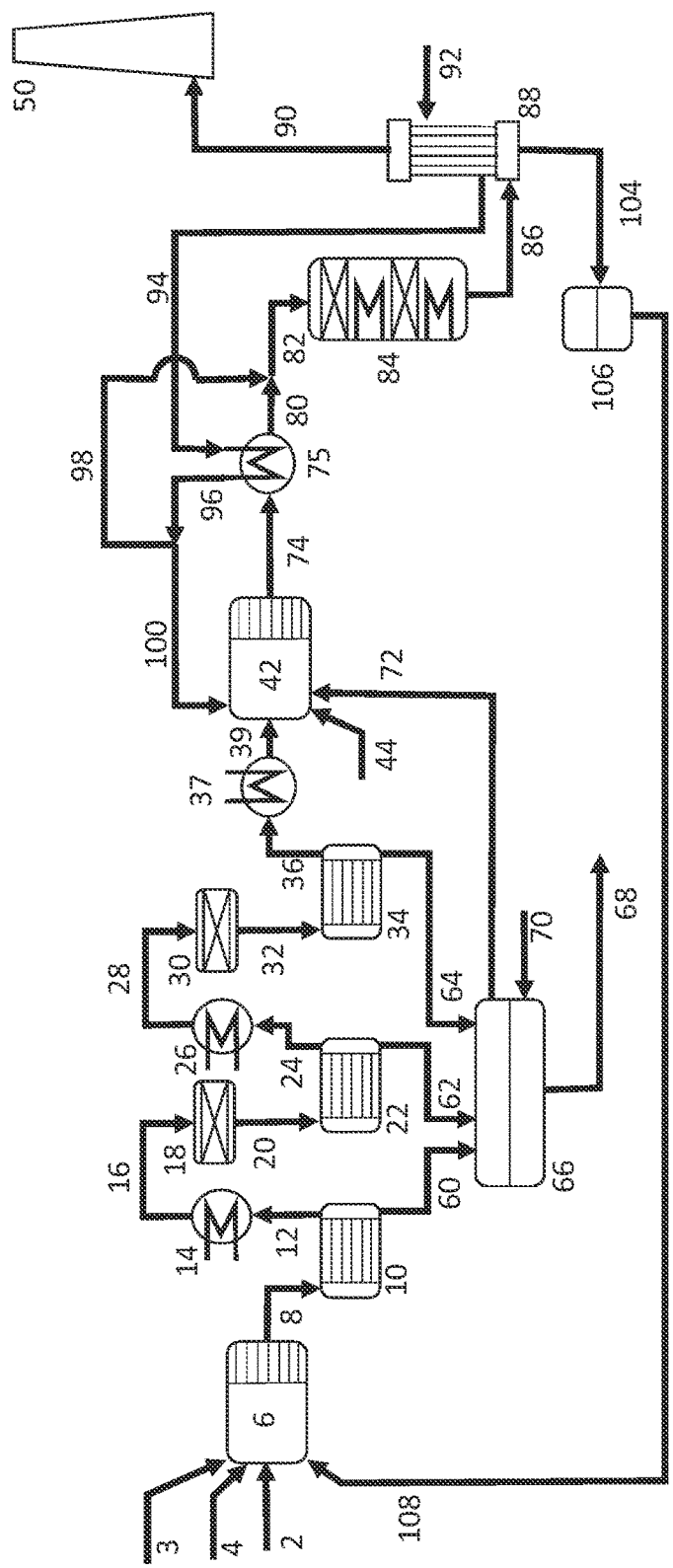
FIG. 1 depicts a Claus plant layout with a sulfuric acid tail gas plant with incineration of the Claus tail gas and recirculation of acid to the Claus reaction furnace.

In FIG. 1, a wet type sulfuric acid plant is the Claus tail gas plant, characterized by at least part of the produced sulfuric acid is recycled to the Claus reaction furnace. The Claus plant receives a feed gas comprising $H_2S$ (2), which is combusted with atmospheric or enriched air (4) in the Claus reaction furnace (6). An optional fuel gas (3) can also be directed to the Claus reaction furnace. In the Claus reaction furnace, $H_2S$ is partly oxidized to $SO_2$ and forms sulfur. Any content of $NH_3$ and/or hydrocarbons in the feed gas is decomposed to $N_2$ and $H_2O$ and $CO_2$ and $H_2O$ respectively. The temperature of the Claus reaction furnace is typically 1,000-1,400° C. with residence times in the range 1-2 seconds. The Claus reaction furnace gas is typically cooled to around 300° C. in a waste heat boiler, located just at the furnace outlet, and the off gas (8) is optionally directed to a sulfur condenser (10) in which elemental sulfur is condensed and withdrawn to the sulfur pit (66) via line 60. The condenser off gas (12) is reheated in a heat exchanger (14) or by means of an in-duct burner and the reheated process gas (16) enters the first Claus reactor (18), which is filled with catalyst comprising activated alumina or titania to react $H_2S$ with $SO_2$ to form elemental sulfur. The reactor off gas (20) is directed to a further sulfur condenser (22), where elemental sulfur is condensed and withdrawn via line 62 to the sulfur pit (66). The process gas (24) then passes a further catalytic Claus stage via process gas reheater (26), Claus reactor (30) and sulfur condenser (34), connected by lines 28 and 32. Condensed sulfur is withdrawn to the sulfur pit (66) via line 64. The tail gas (36) is heated in a heat exchanger (37), preferably using excess heat from the sulfuric acid plant, typically in the form of high pressure steam. The heated Claus tail gas (39) is directed to an incinerator (42), where it is mixed with hot air (100) from the downstream sulfuric acid plant, support fuel (44) and the pit vent gas (72). The pit vent gas is formed by flushing/purging the sulfur pit with atmospheric air supplied via line 70. The pit vent gas is primarily humid air with small amounts of $H_2S$ and $SO_2$. The pit vent gas (72) can also be directed to the Claus reaction furnace (6). The temperature and residence time in incinerator 42 is sufficiently high to allow for complete conversion of all sulfur containing species to $SO_2$, a few percent of the $SO_2$ is further oxidized to $SO_3$. The incinerator off gas is cooled in a waste heat boiler, which is usually an integrated part of the incinerator, and is directed via line 74 to a heat exchanger (75) to be cooled further to the desired temperature at the inlet to the $SO_2$ converter (84). In the $SO_2$ converter, 1-3 layers of $SO_2$ oxidation catalyst comprising vanadium oxide are installed, each layer is separated by a heat exchanger to remove heat of reaction. The fully converted $SO_2$ converter off gas (86) is directed to a sulfuric acid condenser (88), in which sulfuric acid is condensed, concentrated and separated from the process gas, leaving at the bottom of the condenser via line 104 and is cooled and pumped to a sulfuric acid storage tank (106). The clean condenser off gas (90) is directed to the stack (50). The sulfuric acid condenser (88) uses indirect air cooling, where cold cooling air (92) enters in the top and hot air leaves in the bottom (94). At least a part of the hot air may be further heated in heat exchanger (75) and the further heated air 96 is directed to the incinerator via line 100 and some of the further heated air (98) is added to the cooled incinerator off gas (80) to ensure that there is sufficient oxygen available in the $SO_2$ converter feed gas (82) for the $SO_2$ oxidation in the $SO_2$ converter (84). The further heated air (98) can also be added to the process gas (74) upstream the air heater (75).

Should the $SO_2$ converter (84) or the sulfuric acid condenser (88) somehow be forced to an unplanned shut down, the incinerator off gas (74) can be directed to the stack (not shown), allowing the Claus plant to be kept in operation, which will ensure 94-97% sulfur abatement during the failure period.

The sulfuric acid from the sulfuric acid storage tank (106) passes through a pump and is directed to the Claus reaction furnace (6) via line 108. The sulfuric acid is atomized into the furnace either via hydraulic nozzles or preferably via pneumatic (two-phase) nozzles.

Figure 2:
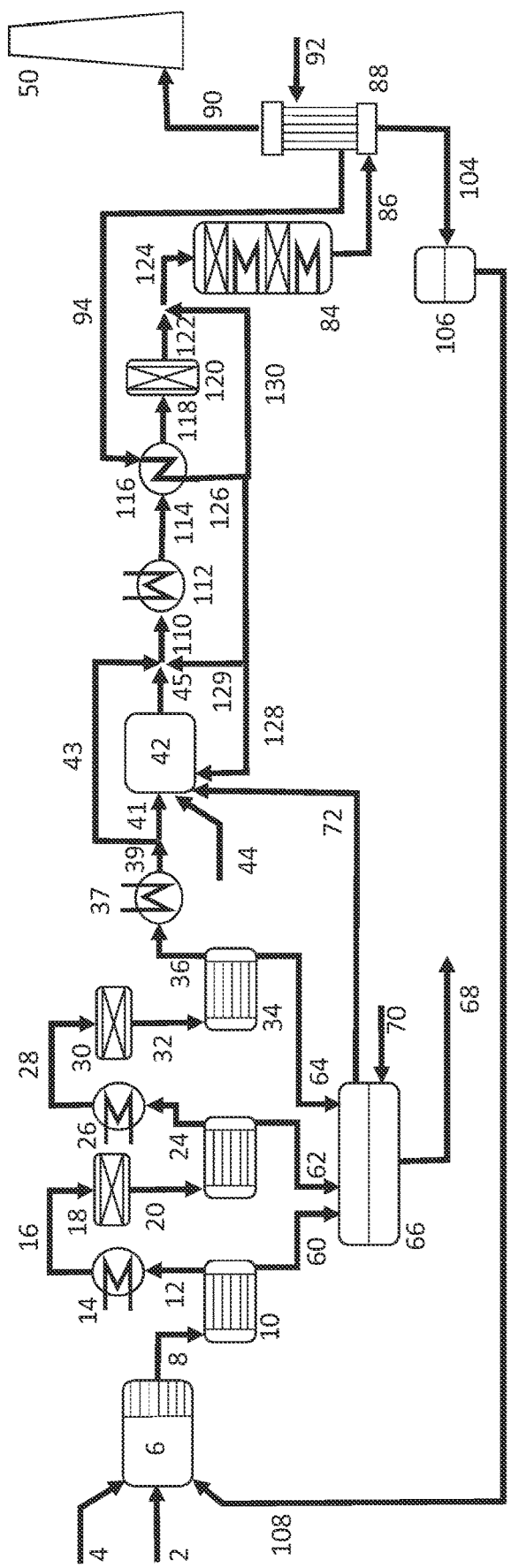
FIG. 2 depicts a Claus plant layout with a partly catalytic sulfuric acid tail gas plant and recirculation of acid to the Claus reaction furnace.

FIG. 2 shows a sulfuric acid plant as the Claus tail gas plant, in which a part of the sulfur compounds in the Claus tail gas (36) are catalytically oxidized.

The Claus plant receives a feed gas comprising $H_2S$ (2), which is combusted with atmospheric or enriched air (4) in the Claus reaction furnace (6). In the Claus reaction furnace, $H_2S$ is partly oxidized to $SO_2$ and forms sulfur. Any content of $NH_3$ and/or hydrocarbons in the feed gas is decomposed to $N_2$ and $H_2O$ and $CO_2$ and $H_2O$ respectively. The temperature of the Claus reaction furnace is typically 1,000-1,400° C. with residence times in the range 1-2 seconds. The Claus reaction furnace gas is typically cooled to around 300° C. in a waste heat boiler, located just at the furnace outlet, and the off gas (8) is optionally directed to a sulfur condenser (10) in which elemental sulfur is condensed and withdrawn to the sulfur pit (66) via line 60. The condenser off gas (12) is reheated in a heat exchanger (14) or by means of an in-duct burner and the reheated process gas (16) enters the first Claus reactor (18), which is filled with catalyst comprising activated alumina or titania to react $H_2S$ with $SO_2$ to form elemental sulfur. The reactor off gas (20) is directed to a further sulfur condenser (22), where elemental sulfur is condensed and withdrawn via line 62 to the sulfur pit (66). The process gas (24) then passes a further catalytic Claus stage via process gas reheater (26), Claus reactor (30) and sulfur condenser (34), connected by lines 28 and 32. Condensed sulfur is withdrawn to the sulfur pit (66) via line 64.

The Claus tail gas (36) is heated in heat exchanger (37) preferentially by means of excess energy from the sulfuric acid plant, preferably in the form of high pressure steam. Downstream the tail gas heater (37), the preheated Claus tail gas (39) is split into two parts: one part (41) is directed to the incinerator (42) and one part is via line 43 directed to a position just downstream the incinerator (42). The incinerator (42) receives oxygen from hot air from the sulfuric acid plant (128), support fuel (44) and optionally pit vent gas (72) from the sulfur pit (66) and all sulfur compounds are oxidized to $SO_2$. The hot process gas from the incinerator (45) is mixed with the bypassed part of the Claus tail gas (43) and optionally an amount of preheated air via line 129 to form a mixed process gas (110), characterized by having a content of Claus tail gas compounds. The mixed process gas is allowed time to react by homogeneous gas phase reactions before the homogeneous reaction zone off gas (110) is cooled in one or two steps via a waste heat boiler (112) and/or a gas/air heat exchanger (116), such that the desired inlet temperature to the catalytic oxidation reactor (120) is achieved. The homogeneous reaction of the mixed process gas may be assigned a specific zone, such as an extension of the incinerator combustion chamber typically with a residence time of 0.5 to 2 seconds, but it may also be a metallic duct. The catalyst in (120) oxidizes all Claus tail gas compounds such as $H_2S$, COS, $CS_2$, $H_2$, $S_8$ and CO to $SO_2$, $H_2O$ and $CO_2$. The catalyst can be a single type or two types as described in EP 2878358. The oxidized process gas (122) is then directed to the $SO_2$ converter (84), in which the $SO_2$ is oxidized to $SO_3$. The air/gas heat exchanger (116) could also be positioned downstream the catalytic reactor (120), depending on the exact composition of the Claus tail gas (36) and the need for air preheating.

The $SO_2$ converter (84) contains 1-3 catalyst layers for $SO_2$ oxidation with coolers installed between the layers in order to remove heat of reaction. The converted and cooled process gas (86) is directed to the sulfuric acid condenser (88) in which concentrated sulfuric acid is withdrawn via line 104 and directed to the sulfuric acid storage tank (106) and the clean process gas (90) is directed to the stack (50). Cooling air for the indirectly cooled condenser (88) is supplied via line 92 and hot cooling air is withdrawn via line 94. Optionally, at least a fraction of the hot cooling air (94) is further heated in gas/air heat exchanger 116 and the further heated cooling air (126) is directed to the incinerator via line 128 and some of the air may be directed via line 129 to a position just downstream the incinerator (42) or via line 130 to a position between the catalytic oxidation reactor (120) and the $SO_2$ converter feed gas (124), supplying sufficient oxygen for the $SO_2$ oxidation in the $SO_2$ converter (84). The further heated air (130) can also be added upstream the catalytic oxidation reactor (120).

The sulfuric acid from the sulfuric acid storage tank (106) passes through a pump and is directed to the Claus reaction furnace (6) via line 108. The sulfuric acid is atomized into the furnace via hydraulic nozzles or preferably via pneumatic (two-phase) nozzles.

In case of a forced shut down of the $SO_2$ converter (84) and sulfuric acid condenser (88), it will for a limited time be possible to direct the oxidized Claus tail gas (122) or alternatively the partly oxidized tail gas (110, not shown), directly to the stack (50), allowing the Claus plant to be kept in operation.

Figure 3:
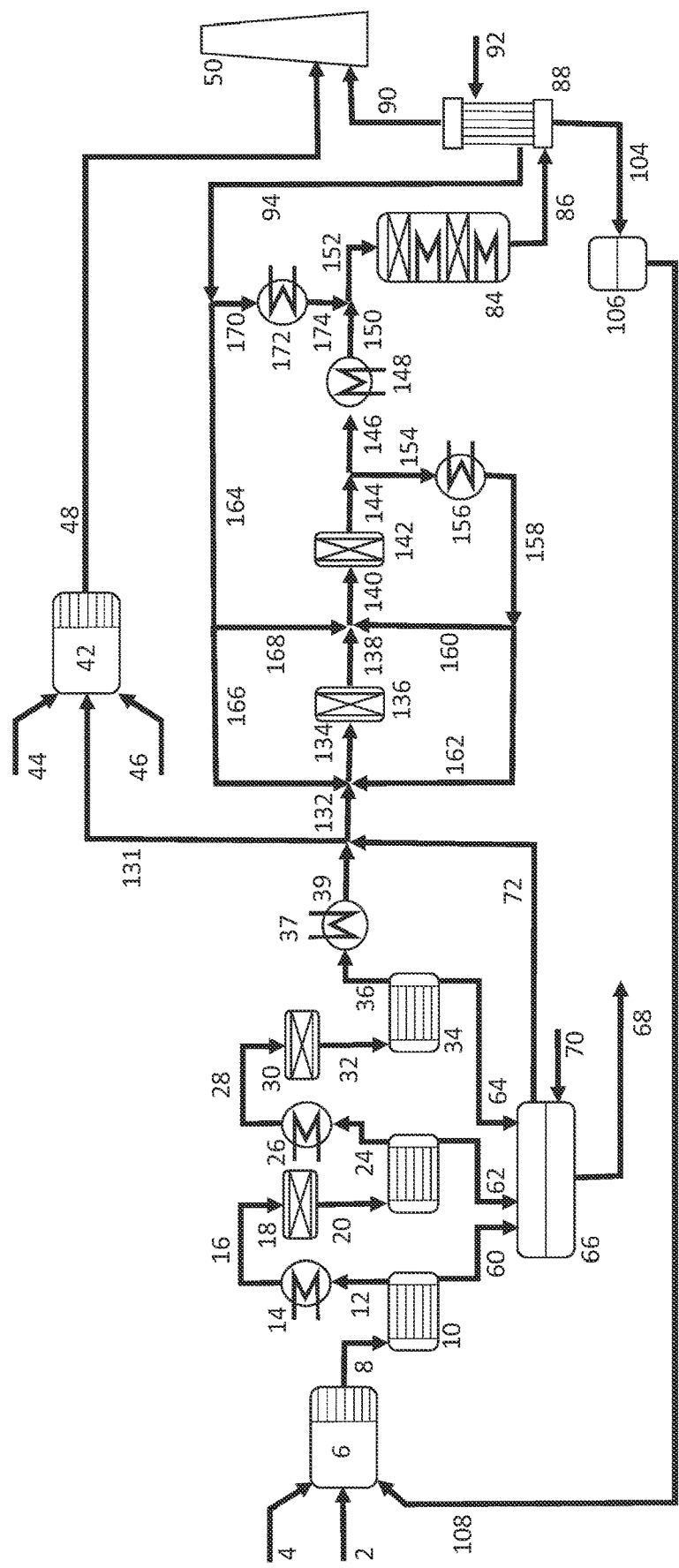
FIG. 3 depicts a Claus plant layout with a fully catalytic sulfuric acid tail gas plant and recirculation of acid to the Claus reaction furnace.

FIG. 3 shows a sulfuric acid Claus tail gas plant, in which the Claus tail gas is oxidized by catalytic means only.

The Claus plant receives a feed gas comprising $H_2S$ (2), which is combusted with atmospheric or enriched air (4) in the Claus reaction furnace (6). In the Claus reaction furnace, $H_2S$ is partly oxidized to $SO_2$ and forms sulfur. Any content of $NH_3$ and/or hydrocarbons in the feed gas is decomposed to $N_2$ and $H_2O$ and $CO_2$ and $H_2O$ respectively. The temperature of the Claus reaction furnace is typically 1,000-1,400° C. with residence times in the range 1-2 seconds. The Claus reaction furnace gas is typically cooled to around 300° C. in a waste heat boiler, located just at the furnace outlet, and the off gas (8) is optionally directed to a sulfur condenser (10) in which elemental sulfur is condensed and withdrawn to the sulfur pit (66) via line 60. The condenser off gas (12) is reheated in a heat exchanger (14) or by means of an in-duct burner and the reheated process gas (16) enters the first Claus reactor (18), which is filled with catalyst comprising activated alumina or titania to react $H_2S$ with $SO_2$ to form elemental sulfur. The reactor off gas (20) is directed to a further sulfur condenser (22), where elemental sulfur is condensed and withdrawn via line 62 to the sulfur pit (66). The process gas (24) then passes a further catalytic Claus stage via process gas reheater (26), Claus reactor (30) and sulfur condenser (34), connected by lines 28 and 32. Condensed sulfur is withdrawn to the sulfur pit (66) via line 64.

The tail gas from the Claus plant (36) is heated in a heat exchanger (37), using excess heat from the sulfuric acid plant. The heated tail gas (39) is mixed with pit vent gas (72) and hot air (166) and optionally an amount of recycled process gas (162). This mixed process gas (134) is directed to a first catalytic reactor (136), in which some of the compounds in the mixed process gas are oxidized and some are not. The partly converted process gas (138) is then optionally cooled in a heat exchanger, such as a boiler, (not shown), mixed with an amount of recycled process gas (160) and/or optionally an amount of hot air (168) to produce a partly converted process gas (140) to the second catalytic reactor (142), in which all combustible compounds (such as $H_2$, CO, COS) are completely oxidized to $CO_2$, $H_2O$ and $SO_2$. The reactor off gas (144) is then split into a recycle fraction (154) and a fraction (146), which is directed to a process gas cooler (148) and further to the $SO_2$ converter (84). The recycled process gas (154) is optionally cooled in heat exchanger 156 and the cooled recycle gas (158) is directed to a position upstream the second catalytic reactor (142) via line 160 and optionally via line 162 to a position upstream the first catalytic reactor (136). A process gas recycle blower will overcome the pressure differences of the process gas, recycle stream and control dampers (not shown). The purpose of the recycling of oxidized process gas is temperature moderation in the catalytic converters 136 and 142.

Converted process gas from any stage in the $SO_2$ converter (84) could also be used as a recycle gas.

The cooled converted process gas (150) from the process gas cooler (148) is optionally mixed with hot air (174) such that the process gas to the $SO_2$ converter (152) has an appropriate temperature and contains sufficient oxygen for the $SO_2$ oxidation reaction. The process gas (152) is then directed to the $SO_2$ converter (84), in which the $SO_2$ is oxidized to $SO_3$. The converter contains 1-3 catalyst layers with coolers installed between the layers in order to remove heat of reaction. The converted and cooled process gas (86) is directed to the sulfuric acid condenser (88) in which concentrated sulfuric acid is withdrawn via line 104 and directed to the sulfuric acid storage tank (106) and the clean process gas (90) is directed to the stack (50). Cooling air for the indirectly cooled condenser (88) is supplied via line 92 and hot cooling air is withdrawn via line 94. Parts of the hot cooling air (94) can be supplied to one or more position in the sulfuric acid plant: upstream the first catalytic reactor 136 via line 166, between outlet of first catalytic reactor (136) and inlet of second catalytic reactor (142) via line 168 and/or upstream the $SO_2$ converter (84) via line 174. The entire hot air stream (94) or any of the individual streams (164, 168, 166, 170) can be further heated in a heat exchanger, as shown for the hot air to the $SO_2$ converter (170), which is further heated in heat exchanger 172, before mixed with the process gas 150, preferably by heat exchange with superheated steam or hot process gas.

The sulfuric acid from the sulfuric acid storage tank (106) passes through a pump and is directed to the Claus reaction furnace (6) via line 108. The sulfuric acid is atomized into the furnace either via hydraulic nozzles or preferably via pneumatic (two-phase) nozzles.

In case of a forced shut down of the sulfuric acid plant, the heated Claus tail gas (39) can be diverted to a thermal incinerator (42) via line 131. Fuel (44) and combustion air (46) is supplied to ensure heating value and oxygen for complete oxidation of combustible species in the Claus tail gas. The incinerator off gas is optionally cooled in a waste heat boiler and directed to the stack (50) via line 48.

As the Claus tail gas temperature is insufficient for initiating the catalytic $H_2S$ oxidation, a start-up heater (not shown) is required to start up the sulfuric acid plant and it is preferably positioned just upstream the second catalytic reactor (142). The heater can either be electrical, fuel gas fired or receive a heating media from another process plant.

EXAMPLE 1: CLAUS TAIL GAS OXIDATION WITH COMBINATION OF THERMAL INCINERATOR AND CATALYTIC OXIDATION

To investigate the effect of the combination of thermal incineration, homogeneous and catalytic oxidation of a Claus tail gas, an example is given for a normal operation of the combined Claus tail gas oxidation layout and an operation in which the $H_2S$ concentration increases due to an upset in the operation of the upstream Claus plant. The plant layout is similar to that shown in FIG. 2.

The Claus tail gas has the following composition during normal operation:

| | |
|---|---|
| 1.0 | vol % CO |
| 0.11 | vol % $CS_2$ |
| 0.01 | vol % COS |
| 1.2 | vol % $H_2$ |
| 0.64 | vol % $H_2S$ |
| 0.01 | vol % $S_x$ |

Balance $N_2$, $CO_2$, $SO_2$ and $H_2O$

The Claus tail gas is preheated to 240° C. and the combustion air to the incinerator is preheated to 400° C. The concentration of combustibles in the Claus tail gas is ~3 vol %.

Around 30% of preheated Claus tail gas is directed to the incinerator, which is controlled to ~1,000° C. by support fuel addition, the $O_2$ concentration in the incinerator off gas is 3 vol %.

The remaining 70% of the preheated Claus tail gas is mixed with the 1,000° C. incinerator off gas and an amount of preheated air, producing a mixed gas with a temperature of 550° C. ignoring homogeneous reactions. The dilution effect reduces the concentration of combustibles by a factor 2.3, bringing the mixture well below the Lower Flammability Level. The mixed gas temperature and $O_2$ concentration are sufficient for homogeneous oxidation of $H_2S$ and $CS_2$ (to COS) to take place, increasing the gas temperature to 600° C. at the outlet of the homogeneous reaction zone. The hot process gas is then cooled in a waste heat boiler to a temperature around 400° C., before it enters the catalytic oxidation reactor for complete oxidation of all combustibles species (primarily CO, $H_2$ and COS) to $CO_2$, $H_2O$ and $SO_2$. The catalyst preferably comprises noble metals, such as Pd and Pt. The reactor outlet temperature becomes 480° C., and thus is increased by 80° C., of which $H_2$ and CO contributes by ~35° C. each and $S_X$ and COS are responsible for the last 10° C. The fully converted process gas is then cooled to 420° C. in a gas/air heat exchanger before the gas is directed to the $SO_2$ converter for catalytic oxidation of $SO_2$ to $SO_3$.

In principle the catalytic oxidation reactor could have operated at 340° C. inlet temperature and have delivered the process gas to the $SO_2$ converter directly at a temperature of 420° C., but in this example the process gas/air heat exchanger is used to increase the combustion air to 400° C., decreasing the need for support fuel and decreasing the size of the incinerator.

In the situation in which the homogeneous oxidation of $H_2S$ and $CS_2$ would not take place (e.g. due to low $O_2$ concentration, reaction time and/or temperature), the 50° C. temperature increase would be released in the catalytic oxidation reactor instead. By lowering the inlet temperature from 400° C. to 350° C., the outlet temperature of 480° C. would be unchanged and the layout would work well.

However, such a layout would be vulnerable to changes in the composition of the Claus feed gas. In a situation where the $H_2S$ concentration suddenly increases from the normal 0.64 vol % to 1.64 vol %, the additional temperature increase in the mixed gas will be ~75° C. Provided the right conditions for homogeneous reactions are fulfilled, the temperature of the mixed gas increases from 600° C. to 675° C. and the waste heat boiler will be well suited to absorb most of this extra heat, possibly only increasing the waste heat boiler outlet temperature by 20° C. to 420° C. and the catalytic oxidation reactor outlet temperature would become 500° C., just at the temperature limit of the catalyst. However, if the homogeneous reactions were not taking place and the oxidation would take place in the catalytic oxidation reactor, the temperature increase would be ~155° C. compared to the normal 80° C. With an inlet temperature of 400° C., the outlet temperature would become 555° C. thus exceeding the maximum operating temperature of the catalyst. Furthermore, the temperature at the inlet to the $SO_2$ converter would also increase, with the consequence of lower conversion of $SO_2$ to $SO_3$ and increased emissions to the atmosphere.

EXAMPLE 2: PLANT SIZE AND ENERGY CONSUMPTION FOR THREE LAYOUTS OF CLAUS TAIL GAS SULFURIC ACID PLANTS

To investigate the effect of the catalytic Claus tail gas oxidation, either partial or fully, process layouts have been calculated for a thermal Claus tail gas oxidation as shown in FIG. 1, a catalytic/thermal layout as shown in FIG. 2 and a fully catalytic layout as shown in FIG. 3.

The Claus tail gas composition is:

| | |
|---|---|
| 1.7 | vol % CO |
| 0.12 | vol % $CS_2$ |
| 0.02 | vol % COS |
| 1.1 | vol % $H_2$ |
| 0.57 | vol % $H_2S$ |
| 0.01 | vol % $S_x$ |

Balance $N_2$, $CO_2$, $SO_2$ and $H_2O$

The fuel gas is primarily $CH_4$ with a heating value of 11,800 kcal/kg.

The combustion air is atmospheric air, preheated to 400° C. when a thermal incinerator is used and 240° C. in the fully catalytic layout.

The Claus tail gas is preheated to 240° C. in the case when a thermal incinerator is used and 195° C. in the case of the fully catalytic layout.

All energy for preheating is taken from the energy released in the Claus tail gas sulfuric acid plant by oxidation of combustibles in the Claus tail gas, $SO_2$ to $SO_3$ oxidation and formation of sulfuric acid.

Table 1 shows the comparable relative numbers for fuel gas consumption, amount of Claus tail gas being admitted in a thermal incinerator and the total amount of combustion air (for fuel, Claus tail gas combustibles and $SO_2$ to $SO_3$ oxidation). The sulfuric acid section size is the relative process gas flow to the catalytic $SO_2$ converter—the three layouts are more or less similar from the inlet to the $SO_2$ converter to the stack and the size of the $SO_2$ converter, heat exchangers and sulfuric acid condenser are proportional to the process gas flow. Much of the surplus energy is converted into steam and exported. In this example, 40 barg superheated steam is produced.

In column "thermal", the reference data for a Claus tail gas oxidation plant is shown, in which the entire amount of Claus tail gas is thermally incinerated at 1000° C., efficiently oxidizing all combustible species to $CO_2$, $H_2O$ and $SO_2$. The fuel gas consumption is high and requires a lot of combustion air, producing a large volume of process gas to be further treated in the downstream sulfuric acid section. Nearly all the energy supplied via the support fuel is converted into high pressure steam, thus the export flow of high pressure steam is high.

In column "thermal+catalytic" it is seen that by combining a small thermal incinerator with a catalytic tail gas oxidation solution, the fuel gas consumption has been decreased to 31% of the base case, where the entire Claus tail gas is admitted into the incinerator. This leads to a significantly lower $O_2$ demand, resulting in a 59% combustion air flow requirement compared to the base case. The benefit of a lower air flow is both a lower air blower operating cost and a smaller process gas flow to the sulfuric acid section, enabling a smaller and thus cheaper section. A process gas flow (sulfuric acid section size) of 78% compared to the base case flow is estimated to reduce the cost of the sulfuric acid section by 15-20%.

The consequence of supplying less fuel gas to the tail gas incinerator is also a decrease in steam export, since up to 90-100% of the energy in the support fuel is converted into high pressure steam in the sulfuric acid plant.

In column "Catalytic" it is seen that by optimized design of the sulfuric acid tail gas plant, using Claus tail gas preheating and two different reactors for catalytic oxidation of the combustibles in the Claus tail gas, it is possible to operate the purely catalytic plant without need for external energy supply.

Since there is no support fuel consumption, the need for $O_2$ for the conversion of the combustibles into energy, $CO_2$, $H_2O$ and $SO_2$ is considerably decreased and is now only 40% of the $O_2$ input compared to the thermal incineration layout. The 40% corresponds to the lowest possible $O_2$ addition for proper oxidation of the species in the Claus tail gas to $CO_2$, $H_2O$ and $SO_3$, including a margin to compensate for small fluctuations in Claus tail gas compositions and to ensure that the catalysts will not experience too low $O_2$ concentration to function efficiently.

As the catalytic layout uses the minimum amount of $O_2$, the resulting process gas flow to the $SO_2$ converter and sulfuric acid condenser is the lowest possible. As seen in row 5 (sulfuric acid section size), the catalytic layout produces only 68% of the process gas to the sulfuric acid section, thus significantly reducing the size of the equipment in the sulfuric acid section and thus saving capital cost.

In row 6 (steam export) it is seen that there is a small energy surplus in the purely catalytic sulfuric acid plant and that is exported as steam. As there is no support fuel addition, the steam export is only 20% of the steam export from the thermal incineration layout.

Not included in table 1 is the effect of the backup incinerator for the purely catalytic layout, as such an incinerator may be desired in case the purely catalytic sulfuric acid plant experience a forced shut down. If the Claus tail gas cannot be oxidized before emitted to the atmosphere, it may become necessary to shut down the Claus plant and upstream plants.

The size of the backup incinerator will depend on several factors, but typically they can operate at much reduced load during hot standby periods. Assuming that the incinerator must operate at 25% of the design load, the fuel gas consumption may increase from the relative value of 0 to a value of 30. That would bring the fuel gas consumption up to the same level as for the combined thermal and catalytic layout. The sulfuric acid section size will still be lower for the purely catalytic solution, thus decreasing the cost of the acid section. The cost reduction will be decreased by installing a back-up incinerator and only a more detailed cost analysis will determine whether the thermal+catalytic or the purely catalytic sulfuric acid plant layout will be the most cost effective.

TABLE 1

|  | Thermal | Thermal + catalytic | Catalytic |
|---|---|---|---|
| Corresponding figure | 1 | 2 | 3 |
| Fuel gas consumption | 100 | 31 | 0 |
| Tail gas to thermal incinerator | 100 | 31 | 0 |
| Total combustion air | 100 | 59 | 40 |
| Sulfuric acid section size | 100 | 78 | 68 |
| 40 barg steam export (400° C.) | 100 | 44 | 20 |

The invention claimed is:

1. A process for production of elemental sulfur from a feedstock gas comprising from 15 vol %, to 100 vol % $H_2S$ and a stream of sulfuric acid, the process comprising
   a. providing a Claus reaction furnace feed stream comprising an amount of said feedstock gas, an amount of sulfuric acid, an amount of oxygen and optionally an amount of fuel, wherein the amount of oxygen is substoichiometric with respect to the Claus reaction,
   b. directing said Claus reaction furnace feed stream to a reaction furnace operating at elevated temperature, providing a Claus converter feed gas,
   c. cooling said Claus converter feed gas to provide a cooled Claus converter feed gas and optionally withdrawing elemental sulfur from the gas,
   d. directing said cooled Claus converter feed gas to contact a material catalytically active in the Claus reaction,
   e. withdrawing a Claus tail gas and elemental sulfur, optionally by cooling the effluent from said material catalytically active in the Claus reaction,
   f. directing a stream comprising said Claus tail gas, oxygen and optionally a fuel as a feedstock gas to a means for sulfur oxidation, providing a $SO_2$ converter feed gas, wherein an amount of combustibles, in the Claus tail gas, is oxidized in the presence of a material catalytically active in sulfur oxidation at an inlet temperature below 400° C.,
   g. directing said $SO_2$ converter feed gas to contact a material catalytically active in $SO_2$ oxidation to $SO_3$, providing an $SO_3$ rich gas,
   h. converting said $SO_3$ rich gas to concentrated sulfuric acid, either by absorption of $SO_3$ in sulfuric acid or by hydration of $SO_3$, cooling and condensation of sulfuric acid,
   i. recycling at least a part of the produced sulfuric acid to the Claus reaction furnace, wherein an amount of the Claus tail gas is directed to an incinerator, providing a combusted Claus tail gas, which is combined with a further amount of Claus tail gas.

2. A process according to claim 1, wherein the concentration of said concentrated sulfuric acid is at least 80 w/w % $H_2SO_4$.

3. A process according to claim 1, wherein the amount of sulfur in the stream of concentrated sulfuric acid is higher than 1% and less than 25% of the total amount of elemental sulfur withdrawn from the process.

4. A process according to claim 1, in which the combined combusted Claus tail gas and further amount of Claus tail gas in the presence of at least 2 vol % $O_2$ is directed to a homogeneous reaction zone with a temperature exceeding 400° C. and at least 0.5 second residence time is provided.

5. A process according to claim 4 in which a turbulence enhancer is installed in said homogeneous reaction zone.

6. A process according to claim 4 in which a steam generating heat exchanger is provided at the outlet of said homogeneous reaction zone.

7. A process according to claim 1, in which the amount of the Claus tail gas which is directed to the incinerator is controlled such that the temperature increase from the oxidation of remaining combustibles in the Claus tail gas in the catalytic part of the means of sulfur oxidation is kept below 200° C.

8. A process according to claim 1, in which none of the Claus tail gas is directed to a non-catalytic means of oxidation.

9. A process according to claim 8 in which an amount of fuel and oxidant is directed to an incinerator, wherein the process may be reconfigured during operation to direct all of said Claus tail gas to the incinerator.

10. A process according to claim 9 in which one or both of the catalytic Claus tail gas oxidation reactors are internally cooled reactors.

11. A process according to claim 8 in which the temperature increase in the catalytic Claus tail gas oxidation reactors is kept below 200° C. by dilution of the catalytic Claus tail gas oxidation reactor feed gas with an amount of recycled oxidized Claus tail gas and/or an amount of oxidant.

12. A process according to claim 1, in which oxidant and an optional process gas volume are added to the Claus tail gas in proportions keeping the mixture of Claus tail gas, optional process gas volume and oxidant below the lower flammability level (LFL) of the mixture.

13. A process according to claim 1, in which oxidant is added to the Claus tail gas in two or more stages in proportions keeping the mixture of Claus tail gas, an optional process gas volume and oxidant below the limiting oxygen concentration (LOC) of the mixture.

14. A process plant comprising
   a Claus reaction furnace,
   a Claus waste heat boiler,
   a Claus conversion section,
   a means for sulfur oxidation, and
   a sulfuric acid section,
wherein
   the Claus reaction furnace has
      a feedstock inlet,
      a sulfuric acid inlet, and
      an outlet,
   the Claus waste heat boiler has
      a gas inlet,
      a gas outlet, and
      an elemental sulfur outlet,
   the Claus conversion section has
      a gas inlet,
      a gas outlet, and
      an elemental sulfur outlet, the means for sulfur oxidation comprises
an incinerator having an inlet and an outlet,
a material catalytically active in sulfur oxidation, and
has an inlet, and
an outlet and
the sulfuric acid section has
a gas inlet,
a gas outlet, and
a sulfuric acid outlet, and
wherein the feedstock inlet of the reaction furnace is configured for receiving
a feedstock gas, and
an oxidant,
wherein the outlet of the Claus reaction furnace is configured for being in fluid communication with the gas inlet of the Claus waste heat boiler,
wherein the gas outlet of the Claus waste heat boiler is configured for being in fluid communication with the gas inlet of the Claus conversion section,
wherein the inlets of the incinerator and the material catalytically active in sulfur oxidation are configured for being in fluid communication with the gas outlet of said Claus conversion section gas, and
wherein the outlets of the incinerator and the material catalytically active in sulfur oxidation are configured for being in fluid communication with the gas inlet of the sulfuric acid section,
wherein the sulfuric acid outlet of the sulfuric acid section is configured to be in fluid communication with the sulfuric acid inlet of said Claus reaction furnace.

* * * * *